(12) United States Patent
Takeda et al.

(10) Patent No.: US 10,356,774 B2
(45) Date of Patent: *Jul. 16, 2019

(54) WIRELESS COMMUNICATION TERMINAL, BASE STATION DEVICE, AND RESOURCE ALLOCATION METHOD

(71) Applicant: Sun Patent Trust, New York, NY (US)

(72) Inventors: Kazuki Takeda, Kanagawa (JP); Hidetoshi Suzuki, Kanagawa (JP); Ayako Horiuchi, Kanagawa (JP); Toru Oizumi, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/963,008

(22) Filed: Apr. 25, 2018

(65) Prior Publication Data

US 2018/0242297 A1 Aug. 23, 2018

Related U.S. Application Data

(63) Continuation of application No. 15/617,955, filed on Jun. 8, 2017, now Pat. No. 9,986,551, which is a
(Continued)

(30) Foreign Application Priority Data

Sep. 27, 2012 (JP) .................................. 2012-214981

(51) Int. Cl.
*H04W 72/04* (2009.01)
*H04L 1/18* (2006.01)
*H04L 5/00* (2006.01)

(52) U.S. Cl.
CPC ......... *H04W 72/042* (2013.01); *H04L 1/1854* (2013.01); *H04L 5/0055* (2013.01);
(Continued)

(58) Field of Classification Search
CPC .. H04W 72/042; H04L 1/1854; H04L 5/0055; H04L 5/0096; H04L 5/001; H04L 5/0023; H04L 5/0035
See application file for complete search history.

(56) References Cited

U.S. PATENT DOCUMENTS 9,706,539 B2\* 7/2017 Takeda ................. H04L 1/1854
2012/0002631 A1 1/2012 Nishio et al.
(Continued)

OTHER PUBLICATIONS

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)," Dec. 2011, 8 pages.
(Continued)

*Primary Examiner* — Peter P Chau
(74) *Attorney, Agent, or Firm* — Seed IP Law Group LLP

(57) ABSTRACT

A wireless communication terminal capable of increasing the utilization efficiency of ACK/NACK resources and suppressing unnecessary PUSCH band reduction while avoiding ACK/NACK collision. The wireless communication terminal has a configuration provided with: a reception unit for receiving a control signal including ARI via an E-PDCCH set from among one or a plurality of E-PDCCH sets; a control unit for determining an offset value indicated by the ARI on the basis of whether or not a resource region that may be taken by a dynamic ACK/NACK resource corresponding to the E-PDCCH set that has received the control signal and a resource region that may be taken by a dynamic ACK/NACK resource corresponding to another E-PDCCH set overlap, and imparting an offset to the ACK/NACK resource according to the value of the ARI; and a transmission unit for transmitting the ACK/NACK signal using the determined ACK/NACK resource.

19 Claims, 16 Drawing Sheets

Related U.S. Application Data continuation of application No. 14/427,431, filed as application No. PCT/JP2013/004160 on Jul. 4, 2013, now Pat. No. 9,706,539.

(52) U.S. Cl.
CPC ............ *H04L 5/0096* (2013.01); *H04L 5/001* (2013.01); *H04L 5/0023* (2013.01); *H04L 5/0035* (2013.01)

(56) References Cited

U.S. PATENT DOCUMENTS

| | | | |
|---|---|---|---|
| 2012/0063350 A1 | 3/2012 | Kim et al. | |
| 2012/0176885 A1 | 7/2012 | Lee et al. | |
| 2012/0243498 A1 | 9/2012 | Kwon et al. | |
| 2012/0320848 A1 | 12/2012 | Chen et al. | |
| 2013/0121304 A1 | 5/2013 | Nory et al. | |
| 2013/0194931 A1* | 8/2013 | Lee | H04L 5/0053 370/241 |
| 2014/0003375 A1 | 1/2014 | Nam et al. | |
| 2014/0036813 A1 | 2/2014 | Lunttila et al. | |
| 2014/0126491 A1* | 5/2014 | Ekpenyong | H04L 5/0055 370/329 |
| 2015/0071195 A1* | 3/2015 | Park | H04L 5/0048 370/329 |
| 2015/0229454 A1 | 8/2015 | Takeda et al. | |

OTHER PUBLICATIONS

3GPP TS 36.212 V10.4.0 "3rd Generation Partnership Project; Technical Specification Group Radio Access Network; Evolved Universal Terrestrial Radio Access (E-UTRA); Multiplexing and channel coding (Release 10)," Dec. 2011, 79 pages.
3GPP TS 36.213 V10.4.0 "3rd Generation Partnership Project; Technical Specification Group Radio Access Network; Evolved Universal Terrestrial Radio Access (E-UTRA); Physical layer procedures (Release 10)," Dec. 2011, 125 pages.
CATT, "PUCCH resource for E-PDCCH," R1-121104, 3GPP TSG RAN WG1 Meeting #68bis, Agenda Item: 7.6.4, Jeju, Korea, Mar. 26-30, 2012, 1 page.
Extended European Search Report dated Oct. 20, 2015, for corresponding EP Application No. 13841685.4-1851 / 2903375, 8 pages.
International Search Report dated Oct. 1, 2013, for corresponding International Application No. PCT/JP2013/004160, 3 pages.
NTT DOCOMO, "Views on PUCCH Resource Allocation for ePDCCH," R1-123554, 3GPP TSG RAN WG1 Meeting #70, Agenda Item: 7.6.6, Qingdao, China, Aug. 13-17, 2012, 4 pages.
Pantech, "PUCCH resource allocation in response to E-PDCCH," R1-122456, 3GPP TSG RAN1 #69, Agenda Item: 7.6.5, Prague, Czech Republic, May 21-25, 2012, 3 pages.
Samsung, "HARQ-ACK PUCCH Resources in Response to E-PDCCH Detections," R1-121647, Agenda Item: 7.6.4, Jeju, Korea, Mar. 26-30, 2012, 2 pages.
Samsung, "HARQ-ACK PUCCH Resources in Response to ePDCCH Detections," R1-122259, 3GPP TSG RAN WG1 #69, Agenda Item: 7.6.5, Prague, Czech Republic, May 21-25, 2012, 2 pages.
Samsung, "PUCCH HARQ-ACK Resource Mapping for DL CA," R1-103637, 3GPP TSG RAN WG1 #61bis, Dresden, Germany, Jun. 28-Jul. 2, 2010, 3 pages.
Panasonic, "Remaining issues on PUCCH resource allocation for ePDCCH," R1-123291, 3GPP TSG-RAN WG1 Meeting #70, Qingdao, China, Aug. 13-17, 2012, 5 pages.
Samsung, "PUCCH Resource Allocation for UL CoMP," R1-122247, 3GPP TSG RAN WG1 Meeting #69, Prague, Czech Republic, May 21-25, 2012, 3 pages.
Samsung, "Uplink control signaling for UL CoMP," R1-123481, 3GPP TSG RAN WG1 #70, Qingdao, China, Aug. 13-17, 2012, 3 pages.
Samsung, Panasonic, KT Corporation, "WF on PUCCH CoMP," R1-123955, 3GPP TSG RAN WG1 #70, Qing Dao, China, Aug. 13-17, 2012, 7 pages.

\* cited by examiner

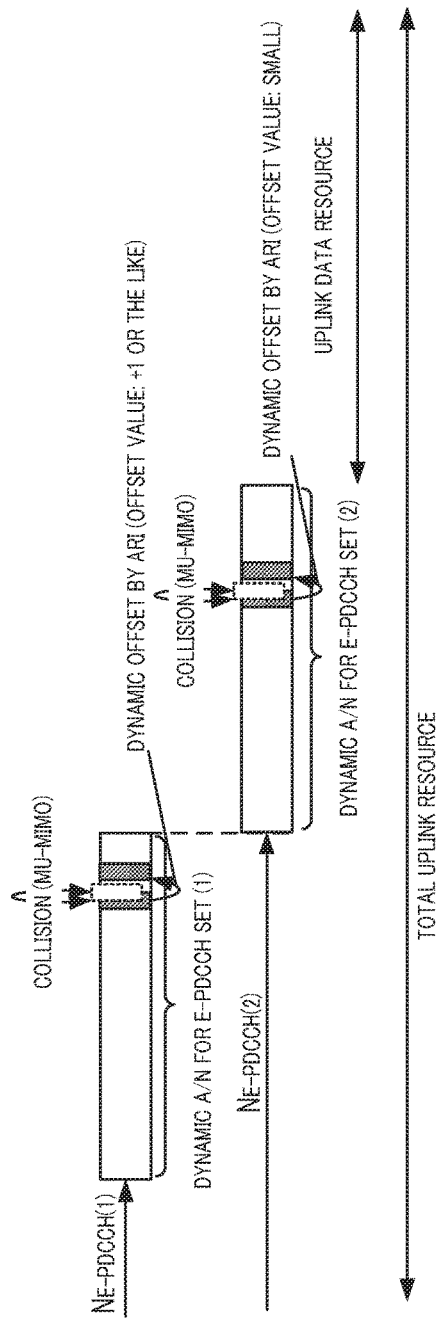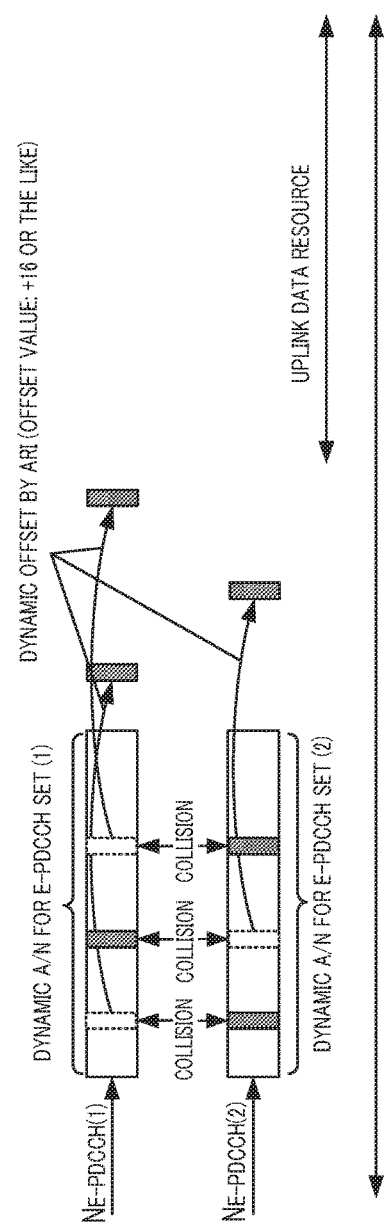
FIG. 14A
FIG. 14B

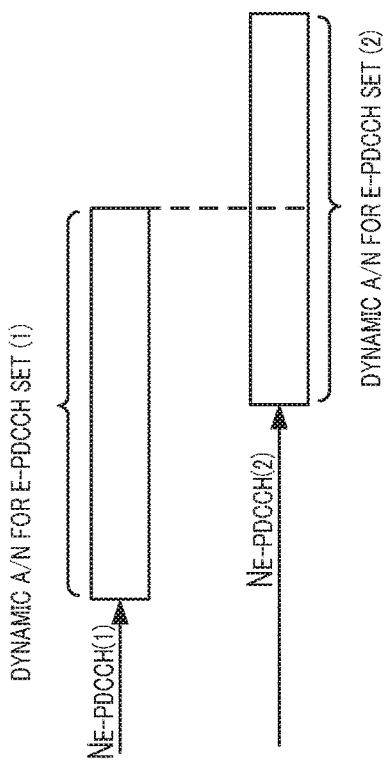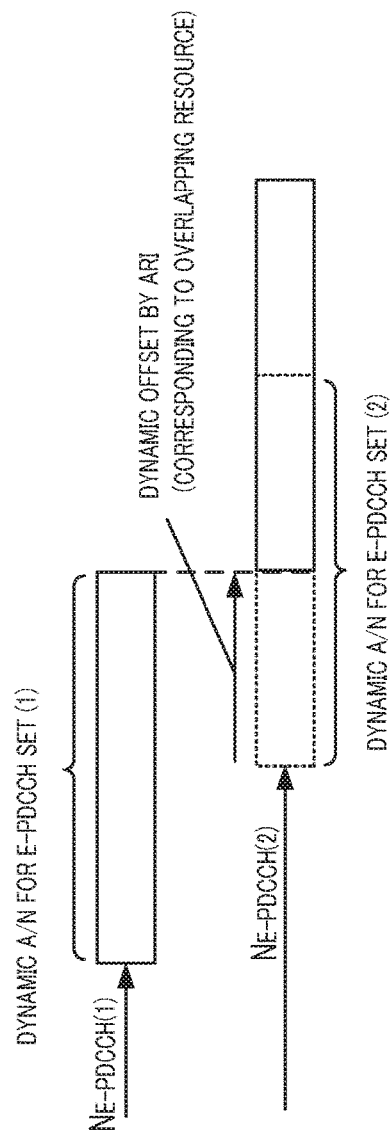
FIG. 16A
FIG. 16B

WIRELESS COMMUNICATION TERMINAL, BASE STATION DEVICE, AND RESOURCE ALLOCATION METHOD

TECHNICAL FIELD

The present invention relates to a radio communication terminal, a base station apparatus, and a resource allocation method.

BACKGROUND ART

The 3GPP (3rd Generation Partnership Project Radio Access Network) has established LTE (Long Term Evolution) Rel. 8 (Release 8) and the extended version of LTE, which is LTE Rel. 10 (LTE-Advanced). In these standards, a base station, and a radio communication terminal (also called "UE (User Equipment)" and referred to below as a terminal) transmit control information for transmitting and receiving data using a downlink PDCCH (physical downlink control channel) (refer to Non-Patent Literature 1 to 3). FIG. 1 shows the subframe configuration of the downlink. In the subframes, the PDCCH that transmits a control signal and the PDSCH (physical downlink shared channel) that transmits a data signal are time-division multiplexed. The terminal first decodes the control information transmitted to the terminal through the PDCCH and obtains information regarding a frequency allocation required for data reception on the downlink, and adaptive control, for example. The terminal then decodes data for the terminal that is included in the PDSCH, based on the control information. If control information that permits data transmission in the uplink is included in the PDCCH, the terminal transmits data on the PUSCH (physical uplink shared channel) of the uplink, based on the control information.

In order to transmit and receive data on the downlink, an HARQ (hybrid automatic request) combining error correction decoding and an automatic retransmission request has been introduced. After performing error correction decoding, the terminal determines whether or not the data is correctly decoded, based on a CRC (cyclic redundancy checksum) added to the data. If the decoding is successful, the terminal feeds back an ACK to the base station. If, however, the decoding fails, the terminal feeds back a NACK to the base station, prompting retransmission of the data in which an error is detected. The feedback of ACK/NACK (acknowledge response; hereinafter referred to as "A/N") is transmitted in the uplink. If data is not assigned to the PUSCH at the time of transmission, transmission is performed on PUCCH (physical uplink control channel). If, however, data is assigned to the PUSCH at the time of A/N transmission, A/N is transmitted on either PUCCH or PUSCH. When this is done, the base station instructs the terminal beforehand as to whether transmission is to be done on PUCCH or PUSCH. FIG. 2 shows the uplink subframe configuration that includes PUSCH and PUCCH.

If A/N is transmitted on the PUCCH, there are situations to be handled differently. For example, if the A/N transmission overlaps with the feedback of CSI (channel state information) periodically transmitted on the uplink, the PUCCH format 2a/2b is used. On the downlink, if carrier aggregation, in which transmission is performed using a plurality of carriers that are bundled together, is set to ON, and also the number of carriers is at least three, PUCCH format 3 is used. However, regardless of whether carrier aggregation is OFF or ON, if the number of carriers is two or fewer and there is no control information other than A/N and other than an uplink scheduling request, even if the number of carriers does not exceed two, PUCCH format 1a/1b are used. In considering that downlink data is transmitted more frequently than uplink data, and also considering that the period of CSI feedback is not more frequent than the period of downlink data assignment, A/N is most often transmitted by PUCCH format 1a/1b. The following description will focus on the PUCCH format 1a/1b.

FIG. 3 shows the slot configuration of the PUCCH format 1a/1b. The A/N signals transmitted by a plurality of terminals are distributed by the Walsh sequence having a length-4 sequence and a DFT (discrete Fourier transform) sequence having a length-3 sequence and are code multiplexed and received at the base station. In FIG. 3, $(W_0, W_1, W_2, W_3)$ and $(F_0, F_1, F_2)$ represent, respectively, the above-noted Walsh sequence and DFT sequence. At the terminal, a signal representing either ACK or NACK first undergoes primary spreading to frequency components corresponding to 1SC-FDMA symbols by a ZAC (zero auto-correlation) sequence (with a subcarrier having a length-12 sequence) in the frequency domain. That is, a ZAC sequence having a sequence length of 12 is multiplied by an A/N signal component represented by a complex number. Then, the A/N signal after primary spreading and the ZAC sequence as a reference signal undergo secondary spreading by a Walsh sequence ($W_0$ to $W_3$ of a length-4 sequence, also called a Walsh code sequence) and a DFT sequence ($F_0$ to $F_2$ of a length-3 sequence). That is, each component of a signal having a length-12 sequence (an A/N signal after primary spreading or a ZAC sequence (reference signal sequence)) is multiplied by each component of an orthogonal sequence (for example, a Walsh sequence or a DFT sequence). Additionally, the signal after secondary spreading is converted by an IFFT (inverse fast Fourier transform) to a length-12 sequence (subcarrier) signal in the time domain. Then, a CP (cyclic prefix) is added to each signal after the IFFT, thereby forming a one-slot signal made up of seven SC-FDMA symbols.

A/N signals from different terminals having different cyclic shift indexes are spread using a ZAC sequence corresponding to different cyclic shift indexes and an orthogonal code sequence corresponding to different orthogonal cover indexes (OC indexes). The orthogonal code sequence is a set of a Walsh sequence and a DFT sequence. The orthogonal code sequence is also called a block-wise spreading code sequence. Therefore, by using the conventional despreading and correlation processing, the base station can demultiplex the plurality of A/N signals that have been code multiplexed and cyclic shift multiplexed. Because there is a limit to the number of A/N signals that can be code multiplexed and cyclic shift multiplexed per frequency resource block (RB), if the number of terminals becomes large, frequency multiplexing is performed using different RBs. In the following, the code-RB resource in which A/N is transmitted will be called the A/N resource. The A/N resource number is determined by the number of the RB in which A/N is transmitted, and the code number and cyclic shift value in the RB. Because multiplexing by cyclic shifting of the ZAC sequence can be treated as a type of code multiplexing, there will be cases in which orthogonal code and cyclic shift will be collectively called code in the following description.

In LTE, in order to reduce interference from other cells on the PUCCH, the ZAC sequence to be used is determined based on the cell ID. Because the mutual correlation between different ZAC sequences is small, by using different ZAC sequences between different cells, the interference can be reduced. Also, in the same manner, sequence hopping and cyclic shift hopping based on the cell ID has been introduced. With this hopping, shifting is done cyclically in units of SC-FDMA symbols, using a cyclic shift hopping pattern determined based on the cell ID, while mutual correlation on the cyclic shift axis and orthogonal code axis are maintained. Doing this enables randomization of combinations of A/N signals that are strongly interfered by other cells, while the mutual orthogonal relationship between A/N signals are maintained within a cell, and also enables removal of continuous strong interference to only some of the terminals from other cells.

In the description to follow, the description will be of the case in which a ZAC sequence is used for primary spreading, and a block-wise spreading code sequence is used for secondary spreading. However, for the primary spreading, rather than using a ZAC sequence, sequences that are mutually separable by mutually different cyclic shift values may be used. For example, a GCL (Generalized Chirp like) sequence, a CAZAC (constant amplitude zero auto correlation) sequence, a ZC (Zadoff-Chu) sequence, a PN sequence such as an M sequence or an orthogonal Gold code sequence, or a computer-generated random sequence having sharp auto correlation characteristics may be used for the primary spreading. As long as the sequence can be treated as being mutually orthogonal or substantially mutually orthogonal, any sequence can be used as a block-wise spreading code sequence for the secondary spreading. For example, a Walsh sequence or a Fourier sequence or the like can be used as a block-wise spreading code sequence for the secondary spreading.

In LTE, as a method of allocating different A/N resources to different terminals, allocation is used that is based on control information mapping results of the PDCCH. That is, using the fact that PDCCH control information is not mapped onto the same resources between a plurality of terminals, a one-to-one correspondence is established between the PDCCH resources and the PUCCH formats 1a/1b A/N resources (hereinafter described simply as A/N resources). This will be described below in detail.

PDCCH is made up of one or more L1/L2 CCHs (L1/L2 control channels). Each L1/L2 CCH is made up of one or more CCEs (control channel elements). That is, a CCE is the basic unit of mapping control information onto a PDCCH. Also, when one L1/L2 CCH is made up of a plurality (2, 4, or 8) of CCEs, a plurality of continuous CCEs with a CCE having an even-numbered index as the origin is allocated to that L1/L2 CCH. The base station, in accordance with the number of CCEs necessary for indication of control information to the subject terminal to which resources are to be allocated, allocates an L1/L2 CCH to the terminal to which the resources are to be allocated. The base station then maps the control information onto the physical resources corresponding to the CCE of that L1/L2 CCH. In this case, there is a one-to-one correspondence between each CCE and A/N resource. Therefore, a terminal that has received an L1/L2 CCH identifies the A/N resources corresponding to the CCEs making up that L1/L2CCH, and uses those resources (that is, codes and frequencies) to transmit the A/N signal to the base station. However, in the case of the L1/L2CCH occupying a plurality of continuous CCEs, the terminal uses an A/N resource corresponding to the CCE having the smallest index of a plurality of PUCCH constituent resources corresponding to a plurality of CCEs (that is, the A/N resource that has been associated with the CCE having a CCE index that is even number) to transmit the A/N signal to the base station. Specifically, the A/N resource number nPUCCH is established by the following equation (Non-Patent Literature 3).

(Equation 1)

$$n_{PUCCH} = N + n_{CCE} \quad [1]$$

In this case, the above-noted A/N resource number nPUCCH is the above-described A/N resource number. N represents the A/N resource offset value given in common within the cell, and nCCE represents the number of the CCE having the smallest index onto which the PDCCH is mapped. According to Equation 1, it can be seen that an A/N resource within a certain range can be used in accordance with the range that can be taken by nCCE. In the following, the A/N resource that determines the resources dependent upon the control information scheduling of the PDCCH in this manner will be noted as D-A/N (dynamic A/N (dynamic ACK/NACK)).

As described above, the A/N resources include frequency resources in addition to code resources. Because the PUCCH and the PUSCH use the same frequency band in the uplink, there is a tradeoff between the region of the PUCCH that includes the D-A/N and the bandwidth of the PUSCH.

CITATION LIST

Non-Patent Literature

NPL 1
3GPP TS 36.211 V10.4.0, "Physical Channels and Modulation (Release 10)," December 2011
NPL 2
3GPP TS 36.212 V10.4.0, "Multiplexing and channel coding (Release 10)," December 2011
NPL 3
3GPP TS 36.213 V10.4.0, "Physical layer procedures (Release 10)," December 2011

SUMMARY OF INVENTION

Technical Problem

In Rel. 11, studies are being carried out on introducing a new control channel E-PDCCH (Enhanced-PDCCH), which is different from PDCCH. Since PDCCH is operated according to cell-specific parameters, there is a problem that PDCCH is not suitable for CoMP (Coordinated multipoint operation) in which coordinated communication is performed among a plurality of different cells or HetNet (heterogeneous network) in which a pico base station is arranged and operated within a cell of a macro base station. E-PDCCH is individually set for each terminal and is transmitted using specific one or a plurality of PRBs (Physical Resource Blocks) specified in advance (hereinafter, E-PDCCH made up of specific one or a plurality of PRBs specified in this way will be described as "E-PDCCH set"). The number of PRBs included in the E-PDCCH set can be changed for each terminal or for each E-PDCCH set independently. One or a plurality of E-PDCCH sets are set for each terminal. FIG. 4 shows an example where two E-PDCCH sets are set: E-PDCCH set (1) made up of four PRBs and E-PDCCH set (2) made up of two PRBs. When downlink data is allocated, a control signal is transmitted and received through conventional PDCCH or one of the E-PDCCH sets.

Studies are being carried out on using an A/N resource offset given from a higher layer for each E-PDCCH set and an index of an enhanced control channel element (eCCE) which is an element unit making up each E-PDCCH set to determine an A/N signal resource for PDSCH allocated using E-PDCCH. That is, an A/N resource number corresponding to E-PDCCH is determined using the value of the above-described A/N resource offset and an eCCE number having the smallest index among numbers of eCCEs onto which E-PDCCH is mapped. As the simplest A/N resource allocation, for example, following equation 2 is under study.

(Equation 2)

$$n_{PUCCH\text{-}E\text{-}PDDCH(n)} N_{E\text{-}PDCCH(n)} + n_{eCCE(n)} \quad [2]$$

Here, $n_{PUCCH\text{-}E\text{-}PDCCH(n)}$ is an A/N resource number, $N_{E\text{-}PDCCH(n)}$ is an A/N resource offset corresponding to n-th E-PDCCH set(n), and $n_{eCCE(n)}$ is an eCCE number having the smallest index among eCCEs by which E-PDCCH is actually transmitted among eCCE numbers defined in E-PDCCH set(n). Note that $N_{E\text{-}PDCCH(n)}$ has a value notified by a higher layer.

By appropriately setting an A/N resource offset corresponding to E-PDCCH set(n), it is possible to appropriately allocate A/N signals to be transmitted by a terminal even in an environment in which PDCCH and one or a plurality of E-PDCCH sets are operated. FIG. 5 shows an example of A/N resource control when PDCCH and two E-PDCCH sets (1) and (2) are operated. Since resource regions that can be taken by respective dynamic A/Ns are defined by the A/N resource offset and the number of eCCEs included in the E-PDCCH set (the number of CCEs in the case of PDCCH), if the value of the A/N resource offset is adjusted so that resource regions do not overlap with each other, it is possible to simultaneously operate PDCCH and E-PDCCH sets (1) and (2). Of all uplink resources, the total amount of resources necessary for PUCCH is thereby determined and the remaining uplink resources are used as PUSCH.

By setting the A/N resource offset to a large enough value, it is possible to operate a plurality of dynamic A/N regions so as not to overlap with each other, whereas the total amount of resources required for D-A/N increases according to the number of E-PDCCH sets used, resulting in an increase in PUCCH overhead.

Conversely, it is also possible to adopt an operation adjusting the A/N resource offset so that a plurality of dynamic A/N regions overlap with each other. FIG. 6 illustrates an example. In this case, since the total amount of necessary PUCCH resources can be reduced, the amount of resources available to PUSCH increases and an improvement of throughput of the uplink can be thereby expected. However, collision (overlapping) of A/N resources used may occur between E-PDCCH sets or PDCCH/E-PDCCH where dynamic A/N regions overlap with each other. When such collision of A/N resources occurs, only one of PDCCH/E-PDCCHs can be allocated (blocked), and therefore the downlink throughput deteriorates.

Thus, a method of adding a control bit for indicating an additional offset within control information of E-PDCCH is being studied as the method of avoiding collision of A/N resources while operating a plurality of dynamic A/N regions so as to overlap with each other. Hereinafter, this control bit will be called "ACK/NACK Resource Indicator (ARI: ACK/NACK index)."

ARI is made up of 1 or a plurality of bits and indicates one of one or a plurality of offset values including offset 0. For example, when ARI has 1 bit, offset value 0 is used when ARI=0 and offset value 10 is used when ARI=1 and so on. Since the offset value can be changed fast for each transmission of control information by E-PDCCH, this offset is also called "dynamic offset." Hereinafter, the additional offset by ARI is described as "dynamic offset."

The dynamic offset by ARI is also useful for multiuser MIMO supported by E-PDCCH. In multiuser MIMO, control information intended for different terminals is multiplexed with the same physical radio resource. However, when there is no ARI, E-PDCCHs onto which control information is scheduled have the same eCCE index among terminals multiplexed in multiuser MIMO, causing collision of A/N resources. Therefore, indicating different dynamic offsets to different terminals using ARI makes it possible to avoid collision of A/N resources in such multiuser MIMO.

When using ARI, a method may be considered which adds a predetermined offset to an A/N resource number determined by an index of eCCE according to the value of ARI as shown in equation 2. Therefore, after scheduling PDCCH/E-PDCCH, if collision of A/N resources occurs among terminals determined from the scheduling result, ARI=0 may be informed to one terminal and ARI=1 may be indicated to the other terminal or the like, and the dynamic offset is thereby indicated to only the one terminal using ARI and another A/N resource is indicated. Thus, even when dynamic A/N regions are operated so as to overlap with each other, it is possible to reduce the probability of collision of A/N resources.

Defining the dynamic offset by ARI to a large value makes it possible to avoid collision of A/N resources with a high probability. Especially when a plurality of dynamic A/N regions are operated so as to overlap with each other as shown in FIG. 7A, if the value of the dynamic offset is large, A/N resources can be indicated beyond overlapping dynamic A/N regions. However, when the value of the dynamic offset by ARI is large, this leads to an increase in resource overhead of PUCCH. Especially when a plurality of dynamic A/N regions are not operated so as to overlap with each other as shown in FIG. 7B, collision of A/N resources never occurs among different dynamic A/N regions and collision of A/N resources in multiuser MIMO becomes problematic. However, by adding a large offset using ARI at the time of collision of A/N resources in multiuser MIMO, the resource overhead of PUCCH increases, the number of resources allocated to uplink data decreases, causing the uplink throughput to deteriorate.

On the other hand, when the dynamic offset by ARI is defined to a small value, avoidance of collision of A/N resources cannot be guaranteed. Especially when a plurality of dynamic A/N regions are operated so as to overlap with each other as shown in FIG. 8A, if the dynamic offset value is small, collision may occur even when the offset is added. On the other hand, when the dynamic offset value by ARI is small, if a plurality of dynamic A/N regions are not operated so as to overlap with each other as shown in FIG. 8B, there is a merit that it is possible to avoid collision of A/N resources in multiuser MIMO and minimize an increase in overhead of PUCCH resources.

An object of the present invention is to provide a radio communication terminal, a base station apparatus and a resource allocation method capable of increasing A/N resource utilization efficiency and preventing a useless reduction of a PUSCH band while avoiding A/N collision in E-PDCCH that indicates a dynamic offset of an A/N resource using an ARI.

Solution to Problem

A radio communication terminal according to an aspect of the present invention includes: a receiving section that receives a control signal including an ACK/NACK index (ARI: ACK/NACK Resource Indicator) via any one E-PDCCH set among one or a plurality of E-PDCCH sets; a control section that determines an offset value indicated by the ARI depending on whether or not a resource region usable for a dynamic ACK/NACK resource corresponding to the E-PDCCH set via which the control signal has been received overlaps with a resource region useable for a dynamic ACK/NACK resource corresponding to another E-PDCCH set and that gives an offset to the ACK/NACK resource according to the ARI value; and a transmitting section that transmits an ACK/NACK signal using the determined ACK/NACK resource.

A base station apparatus according to an aspect of the present invention includes: a control section that determines an offset value indicated by an ACK/NACK index (ARI: ACK/NACK Resource Indicator) according to whether or not a resource region usable for a dynamic ACK/NACK resource corresponding to an E-PDCCH set via which a control signal has been received overlaps with a resource region usable for a dynamic ACK/NACK resource corresponding to another E-PDCCH set and gives an offset to the ACK/NACK resource according to the ARI value; and a transmitting section that transmits the control signal including the ARI via any one E-PDCCH set among one or a plurality of E-PDCCH sets.

A resource allocation method according to an aspect of the present invention includes: determining an offset value indicated by an ACK/NACK index (ARI: ACK/NACK Resource Indicator) according to whether or not a resource region usable for a dynamic ACK/NACK resource corresponding to an E-PDCCH set via which a control signal has been received overlaps with a resource region usable for a dynamic ACK/NACK resource corresponding to another E-PDCCH set; and giving an offset to the ACK/NACK resource according to a value of the ARI index.

Advantageous Effects of Invention

According to the present invention, it is possible to increase A/N resource utilization efficiency and prevent a useless reduction of a PUSCH band while avoiding collision of A/N signals for downlink data.

BRIEF DESCRIPTION OF DRAWINGS

FIGS. 14A and 14B are diagrams illustrating offset values added by ARI according to the embodiment of the present invention;

FIGS. 16A and 16B are diagrams illustrating an offset value added by ARI according to variation 2 of the embodiment of the present invention.

DESCRIPTION OF EMBODIMENTS

Figure 1:
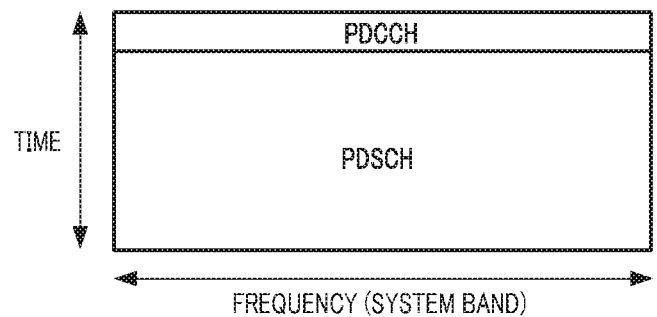
FIG. 1 is a drawing showing the subframe configuration of the downlink.
Figure 2:
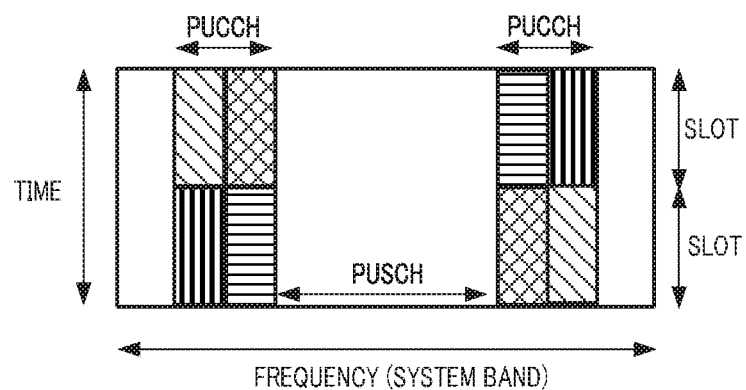
FIG. 2 is a drawing showing the subframe configuration of the uplink.
Figure 3:
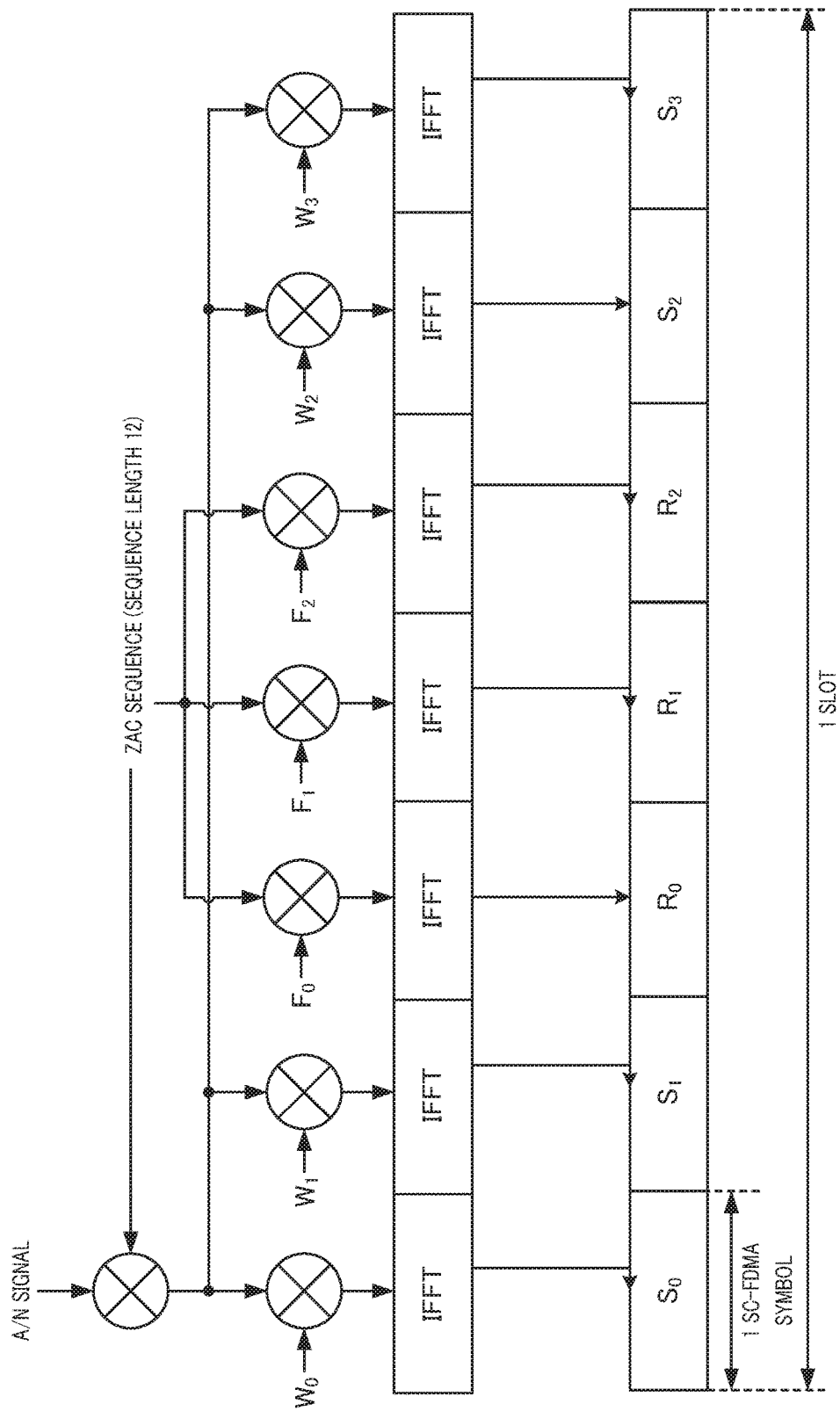
FIG. 3 is a drawing describing the method of spreading of the A/N signal in the PUCCH formats 1a/1b.
Figure 4:
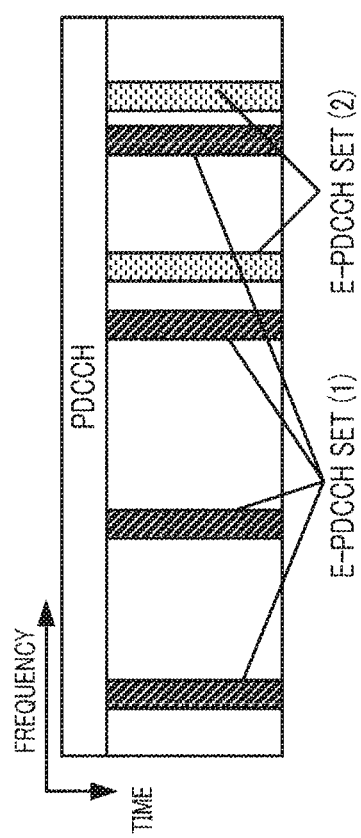
FIG. 4 is a drawing showing an example of the subframe configuration of the downlink at the time of E-PDCCH transmission.
Figure 5:
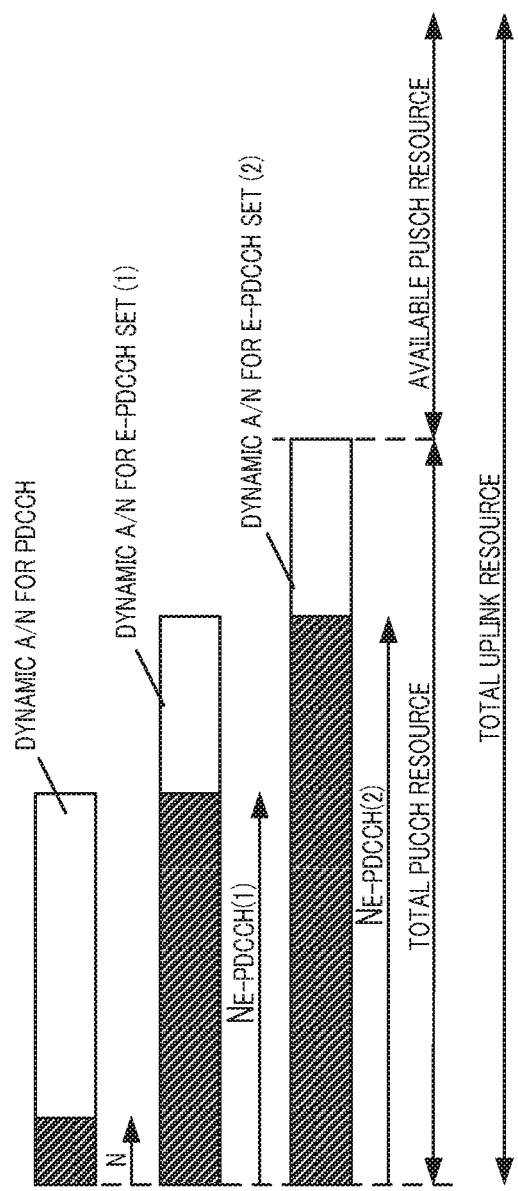
FIG. 5 is a diagram illustrating uplink resources when respective dynamic A/N regions corresponding to PDCCH and a plurality of E-PDCCH sets are set so as not to overlap with each other.
Figure 6:
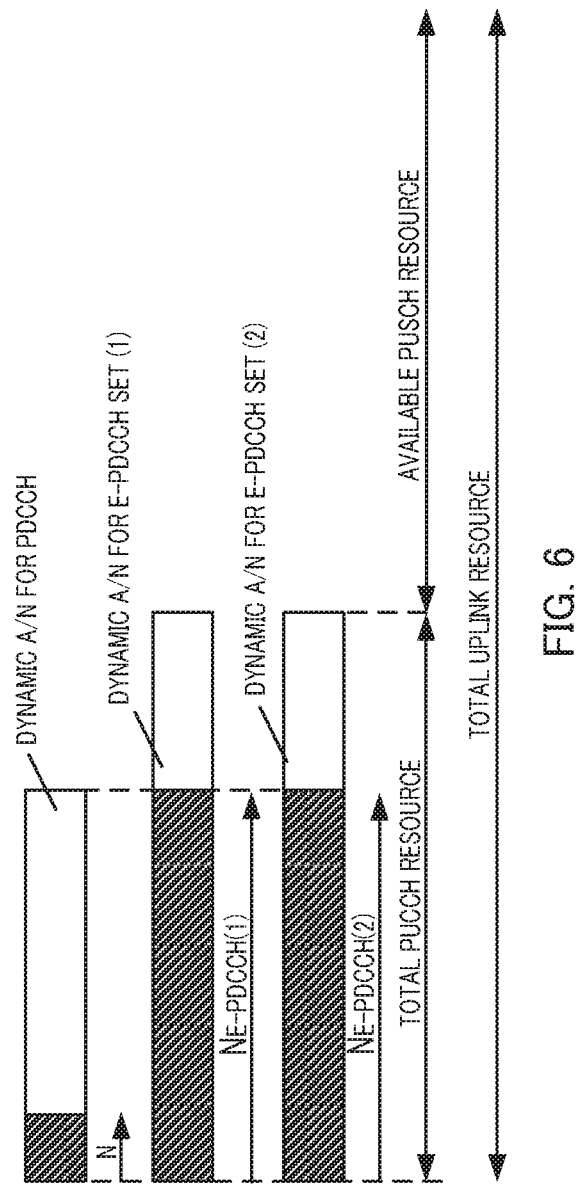
FIG. 6 is a diagram illustrating uplink resources when respective dynamic A/N regions corresponding to a plurality of E-PDCCH sets are set so as to overlap with each other.
Figures 7A, 7B:
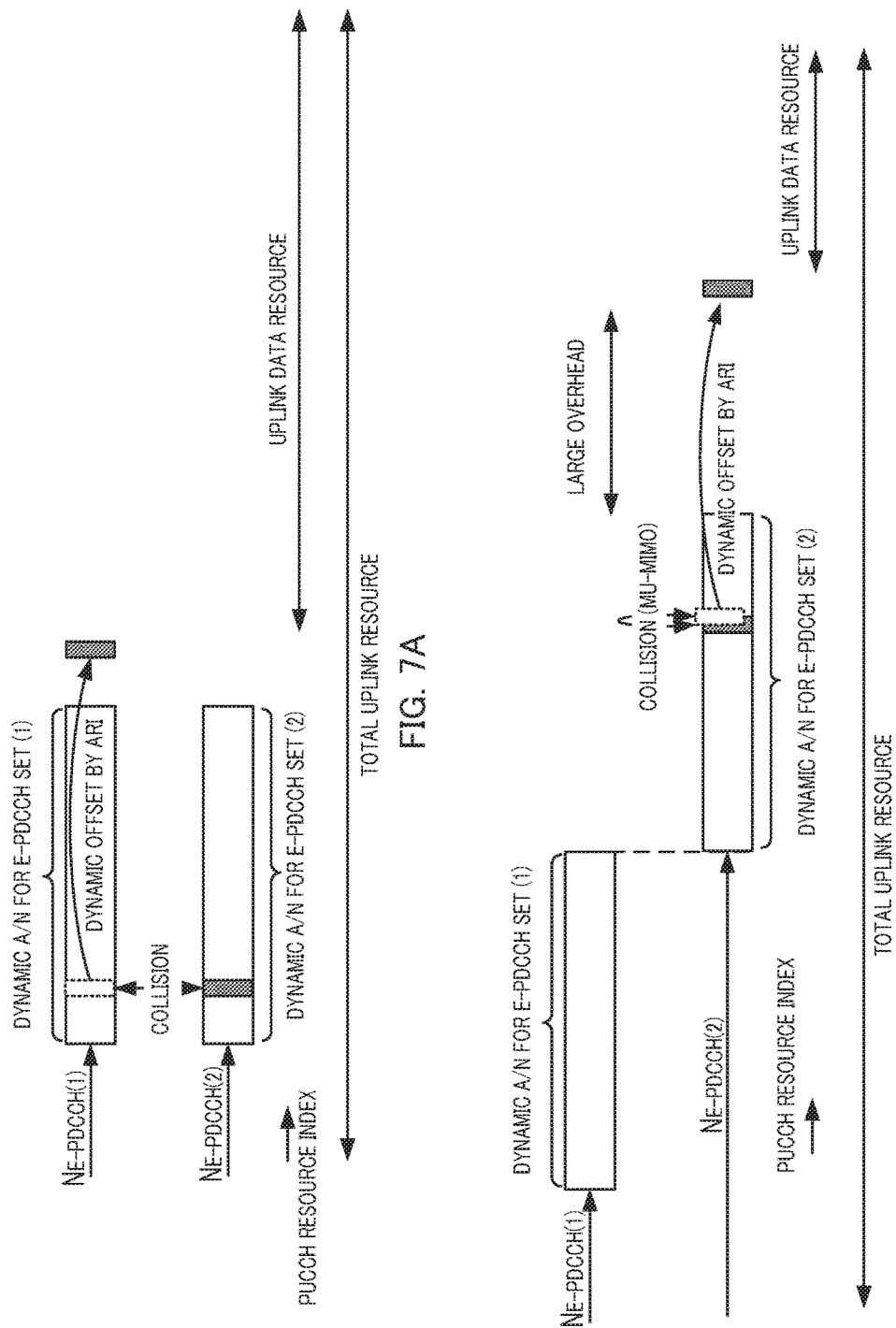
FIGS. 7A and 7B are diagrams illustrating an example when a dynamic offset is added when an offset by ARI has a large value.
Figure 8A:
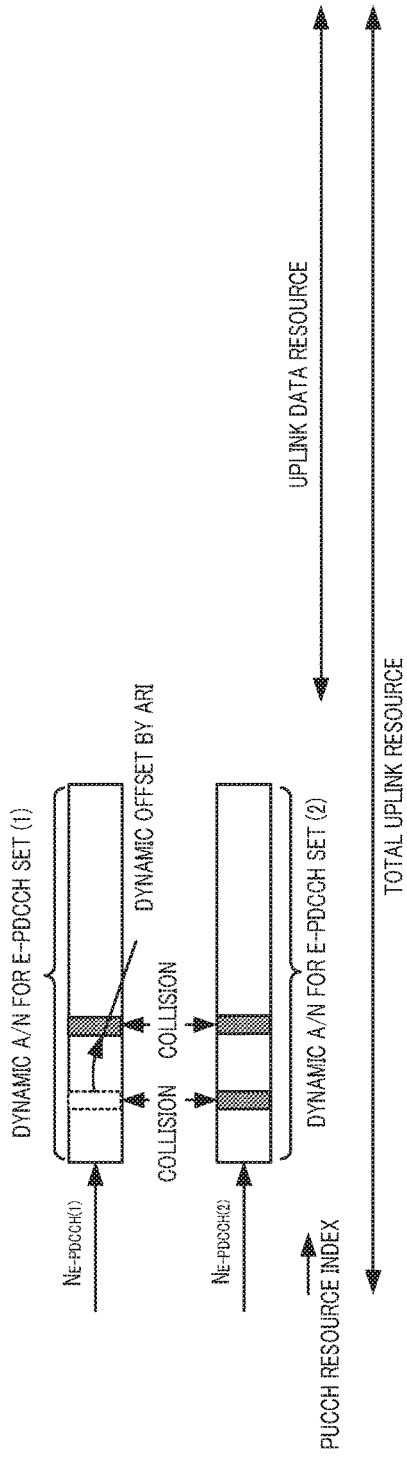
FIGS. 8A and 8B are diagrams illustrating an example when a dynamic offset is added when an offset by ARI has a small value.
Figure 8B:
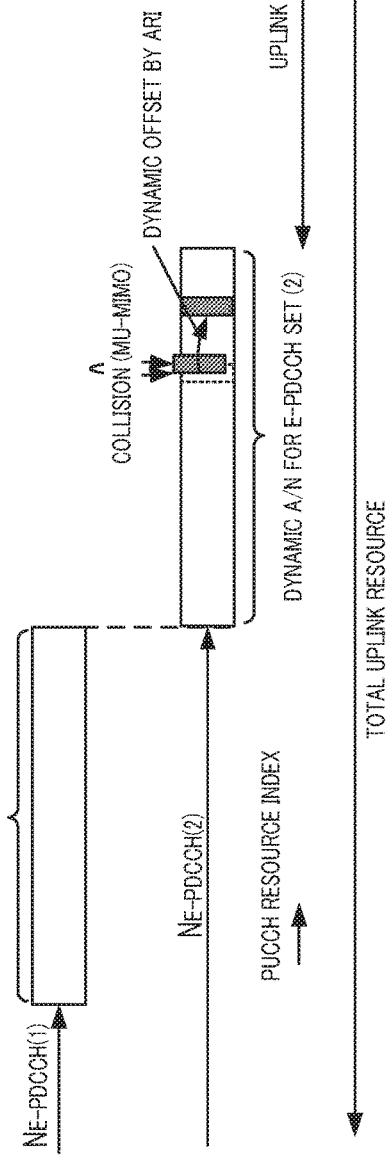

Hereinafter, embodiments of the present invention will be described in detail with reference to the accompanying drawings. Note that the same components in the embodiments are assigned the same reference numerals and any overlapping description thereof will be omitted.

[Overview of Communication System]

Figure 9:
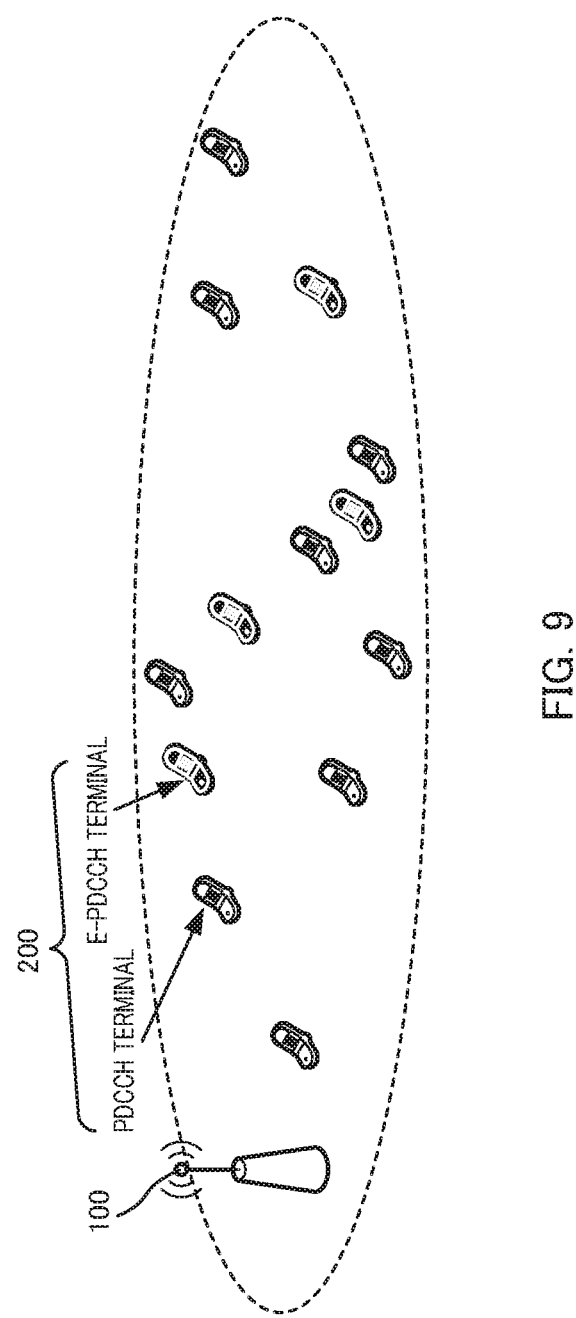
FIG. 9 is a drawing showing a communication system according to an embodiment of the present invention.

FIG. 9 is a drawing showing a communication system according to the present embodiment. The communication system shown in FIG. 9 is constructed of one base station 100 and a plurality of terminals 200 within a cell. In FIG. 9, only one base station 100 is installed within the cell, but the system can also be operated in a HetNet (Heterogeneous network) or CoMP (Coordinated multipoint) in which pico base stations or RRHs (Remote radio heads) connected through large capacity backhaul such as an optical fiber are distributedly arranged within the same cell.

[Configuration of Base Station 100]

Figure 10:
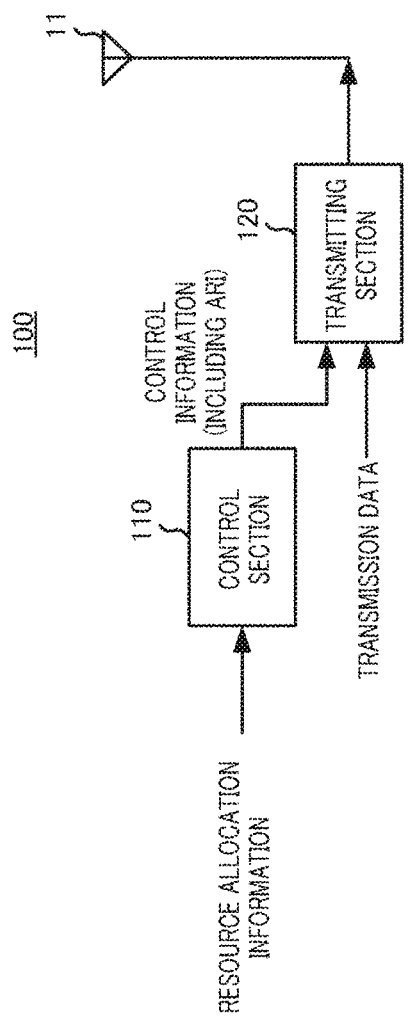
FIG. 10 is a drawing showing a main part of a base station according to the embodiment of the present invention.

FIG. 10 is a block diagram showing a main part of base station 100.

Base station 100, as shown in FIG. 10, has control section 110 that generates a plurality of pieces of control information to be transmitted to a plurality of terminals 200, respectively, and transmitting section 120 that converts control information and transmission data to a radio transmission signal and transmits the signal by radio via antenna 11.

Control section 110 generates control information for each terminal 200 from downlink resource allocation information or the like. Control section 110 schedules the control information to be transmitted to each terminal 200 onto PDCCH or E-PDCCH. When control information is transmitted by E-PDCCH, the control information is transmitted by one of E-PDCCH sets among one or a plurality of E-PDCCH sets set beforehand for terminal 200. An E-PDCCH terminal is notified of an offset value of an A/N resource number using ARI included in E-PDCCH. Therefore, control section 110 generates control information of the E-PDCCH terminal including ARI and outputs the control information to transmitting section 120.

Here, the offset value indicated by ARI is assumed to vary depending on setting information of E-PDCCH, that is, A/N resource offset value of each of one or a plurality of E-PDCCH sets set for the terminal and the total number of eCCEs included in each E-PDCCH set or the like.

Transmitting section 120 transmits, by radio, the signals through the channels, which include transmission data and control data. That is, transmitting section 120 transmits, respectively, transmission data by the PDSCH, PDCCH terminal control information by the PDCCH, and E-PDCCH terminal control information by the E-PDCCH.

Figure 11:
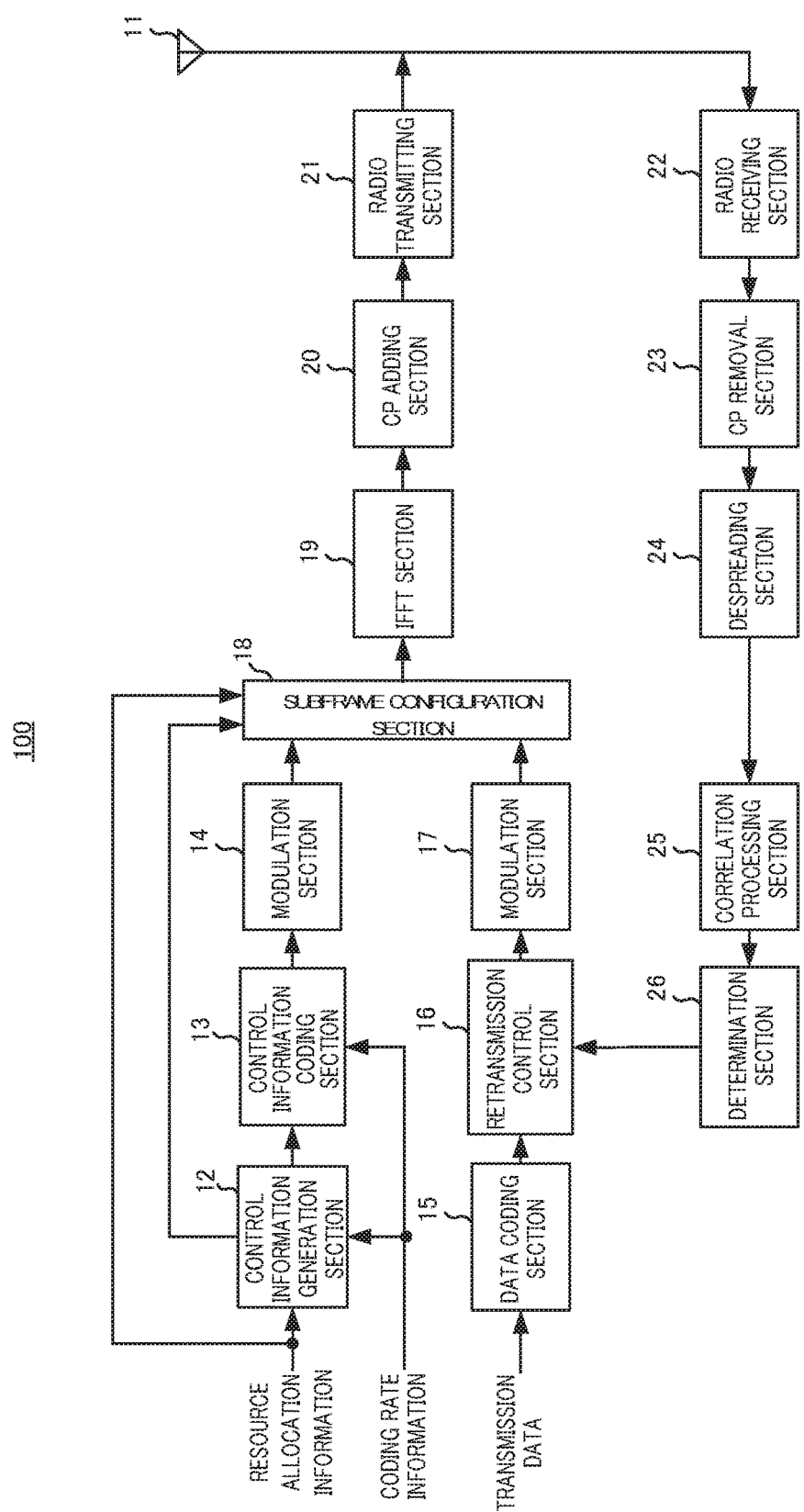
FIG. 11 is a block diagram illustrating details of the base station according to the embodiment of the present invention.

FIG. 11 is a block diagram showing the details of base station 100.

In detail, base station 100, as shown in FIG. 11, includes antenna 11, control information generation section 12, control information coding section 13, modulation sections 14 and 17, data coding section 15, retransmission control section 16, subframe configuration section 18, IFFT section 19, CP adding section 20, radio transmitting section 21, and the like. Base station 100 also includes radio receiving section 22, CP removal section 23, despreading section 24, correlation processing section 25, determination section 26, and the like.

Of these constituent elements, control information generation section 12 functions mainly as control section 110 (FIG. 10), and the constituent elements from control information coding section 13 to radio transmitting section 21 and data coding section 15 to radio transmitting section 21 function mainly as transmitting section 120 (FIG. 10).

Base station 100 transmits PDCCH, E-PDCCH, and PDSCH on the downlink and base station 100 also receives PUCCH carrying the A/N signal on the uplink. In this case, to avoid having the description become complex, the constituent elements related to the downlink transmission of PDCCH, E-PDCCH, and PDSCH, which are closely connected with the features of the present embodiment, and the uplink reception of PUCCH with respect to that downlink data are mainly shown. The constituent elements related to uplink data reception are omitted in the illustration and descriptions.

The downlink control signal (e.g., resource allocation information) and data signal (transmission data) generated by base station 100 are each separately encoded, modulated, and input to subframe configuration section 18.

First, the generation of the control signal will be described. Control information generation section 12 generates the control information for each terminal 200, from the resource allocation results (resource allocation information) and the coding rate information of each terminal 200 for which downlink allocation is to be done. The control information for each terminal 200 includes terminal ID information indicating for which terminal 200 the control information is intended. For example, the CRC bit masked by the ID number of terminal 200 that is the control information notification destination is included in control information as the terminal ID information. In this case, different information is included in the control information mapped onto the PDCCH and the control information mapped onto the E-PDCCH. The control information mapped onto E-PDCCH in particular includes ARI for indicating the amount of dynamic offset of the A/N resource number. The generated control information for each terminal 200 is input to control information coding section 13.

Control information coding section 13 independently encodes the control information for each terminal 200 based on coding rate information. The encoding may be done with the control information mapped onto the PDCCH and the control information mapped onto the E-PDCCH being either same or different. The output of control information coding section 13 is input to modulation section 14.

Modulation section 14 independently modulates the control information of each terminal 200. The modulation may be done with the control information mapped onto the PDCCH and the control information mapped onto the E-PDCCH being either same or different. The output of modulation section 14 is input to subframe configuration section 18.

Next, the generation of the data signal will be described. Data coding section 15 adds a CRC bit that is masked based on the ID of each terminal 200 to the data bit stream (transmission data) transmitted to each terminal 200 and performs error correction coding. The output of data coding section 15 is input to retransmission control section 16.

Retransmission control section 16 holds the coded transmission data for each terminal 200 and outputs the transmission data to modulation section 17 at the time of the first transmission. With respect to terminal 200 to which the NACK signal has been input from determination section 26, that is, terminal 200 that will perform retransmission, retransmission control section 16 outputs the transmitted data for retransmission to modulation section 17.

Modulation section 17 performs data modulation of each of the data coded sequences for each terminal 200. The modulated streams are input to subframe configuration section 18.

Subframe configuration section 18 maps the input control information sequences and data sequences onto resources divided by the time and frequency of a subframe based on resource allocation information. By doing this, subframe configuration section 18 configures and outputs subframes to IFFT section 19.

IFFT section 19 performs an IFFT (inverse fast Fourier transform) on the transmission subframes that are input thereto, thereby obtaining a time waveform, which is input to CP adding section 20.

CP adding section 20 adds a CP to each OFDM symbol within the subframe and outputs the result to radio transmitting section 21.

Radio transmitting section 21 performs radio modulation of the input symbols to the carrier frequency band and transmits the modulated downlink signal via antenna 11.

Radio receiving section 22 receives, as input, an A/N signal of terminal 200 from antenna 11 and performs radio demodulation on the input signal. The demodulated downlink signal is input to CP removal section 23.

CP removal section 23 removes the CP from each SC-FDMA (single carrier-frequency-division multiple access) symbol within the downlink signal. After removal of the CPs, the symbols are input to despreading section 24.

In order to extract the A/N of the target terminal 200 from the A/N signals of a plurality of terminals 200 that have been code multiplexed, despreading section 24 performs despreading by a corresponding orthogonal code. The despread signal is input to correlation processing section 25.

Correlation processing section 25 performs correlation processing by a ZAC sequence in order to extract the A/N. The signal after correlation processing is input to determination section 26.

Determination section 26 determines whether the A/N of terminal 200 is ACK or NACK. If the determination result indicates ACK, determination section 26 prompts retransmission control section 16 to transmit the next data. If, however, the determination result indicates NACK, determination section 26 prompts retransmission control section 16 to perform retransmission.

[Configuration of Terminal 200]

Figure 12:
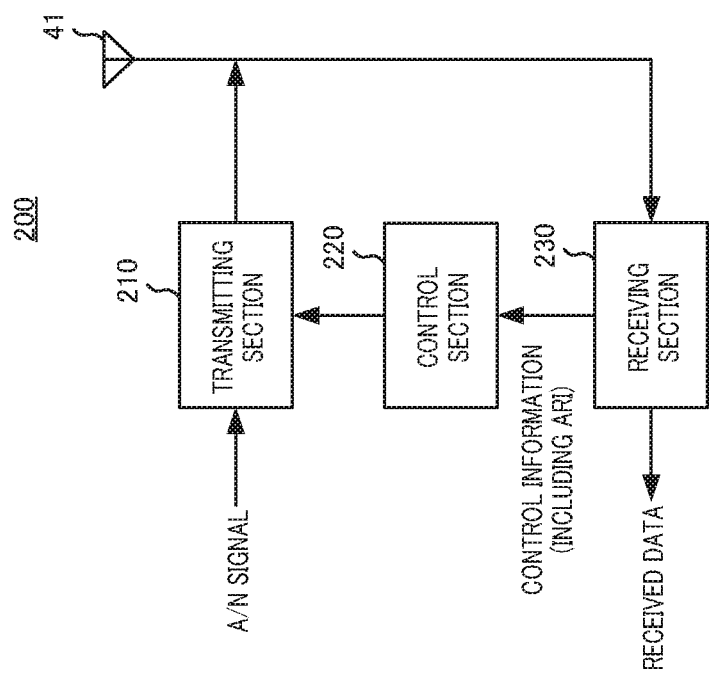
FIG. 12 is a block diagram illustrating main parts of a terminal according to the embodiment of the present invention.

FIG. 12 is a block diagram showing a main part of a terminal.

Terminal 200 includes receiving section 230 that receives control information and downlink data via antenna 41, control section 220 that determines the resource used for transmitting the A/N signal, based on the control information, and transmitting section 210 that transmits the A/N signal using the determined resource.

If terminal 200 is set to receive E-PDCCH control information, terminal 200 becomes an E-PDCCH terminal, and if terminal 200 is set to receive PDCCH control information, terminal 200 becomes a PDCCH terminal. Terminal 200 may also be set to receive both E-PDCCH control information and PDCCH control information. That is, terminal 200 set to receive both attempts to receive control information from both E-PDCCH and PDCCH, and becomes an E-PDCCH terminal upon successfully extracting control information of terminal 200 itself from E-PDCCH and becomes a PDCCH terminal upon successfully extracting control information of terminal 200 itself from PDCCH. Terminal 200 becomes a PDCCH terminal unless otherwise indicated or specified.

Information on the E-PDCCH set which may include control information of terminal 200 itself is further indicated to terminal 200 from a higher layer such as RRC. The number of E-PDCCH sets may be one or plural. When a plurality of E-PDCCH sets are set, terminal 200 attempts to perform E-PDCCH blind detection on each of the E-PDCCH sets. When a plurality of E-PDCCH sets are set, terminal 200 recognizes which E-PDCCH set is used by PRB that has detected E-PDCCH of terminal 200 itself.

Receiving section 230 receives received data via the PDSCH, and control information via the E-PDCCH or PDCCH. That is, in the case of E-PDCCH terminal 200, receiving section 230 receives control information including ARI via the E-PDCCH, and in the case of PDCCH terminal, receives control information via the PDCCH. Receiving section 230 outputs the received control information to control section 220.

In the case of E-PDCCH terminal 200, control section 220 identifies the transmission resource for the A/N signal of the received data based on setting information of the E-PDCCH set to which the received E-PDCCH control information belongs, A/N resource offset value, setting information of one or a plurality of E-PDCCH sets which is set in terminal 200 but has not been used, A/N resource offset value, minimum eCCE index onto which E-PDCCH is mapped and ARI value or the like as an A/N resource to be used for feedback. In the case of PDCCH terminal 200, control section 220 determines the A/N signal transmission resource in the same manner as a conventional PDCCH terminal. Control section 220 outputs the details of the determination to transmitting section 210.

Transmitting section 210 uses the determined resource to transmit the A/N signal of the received data by radio.

Figure 13:
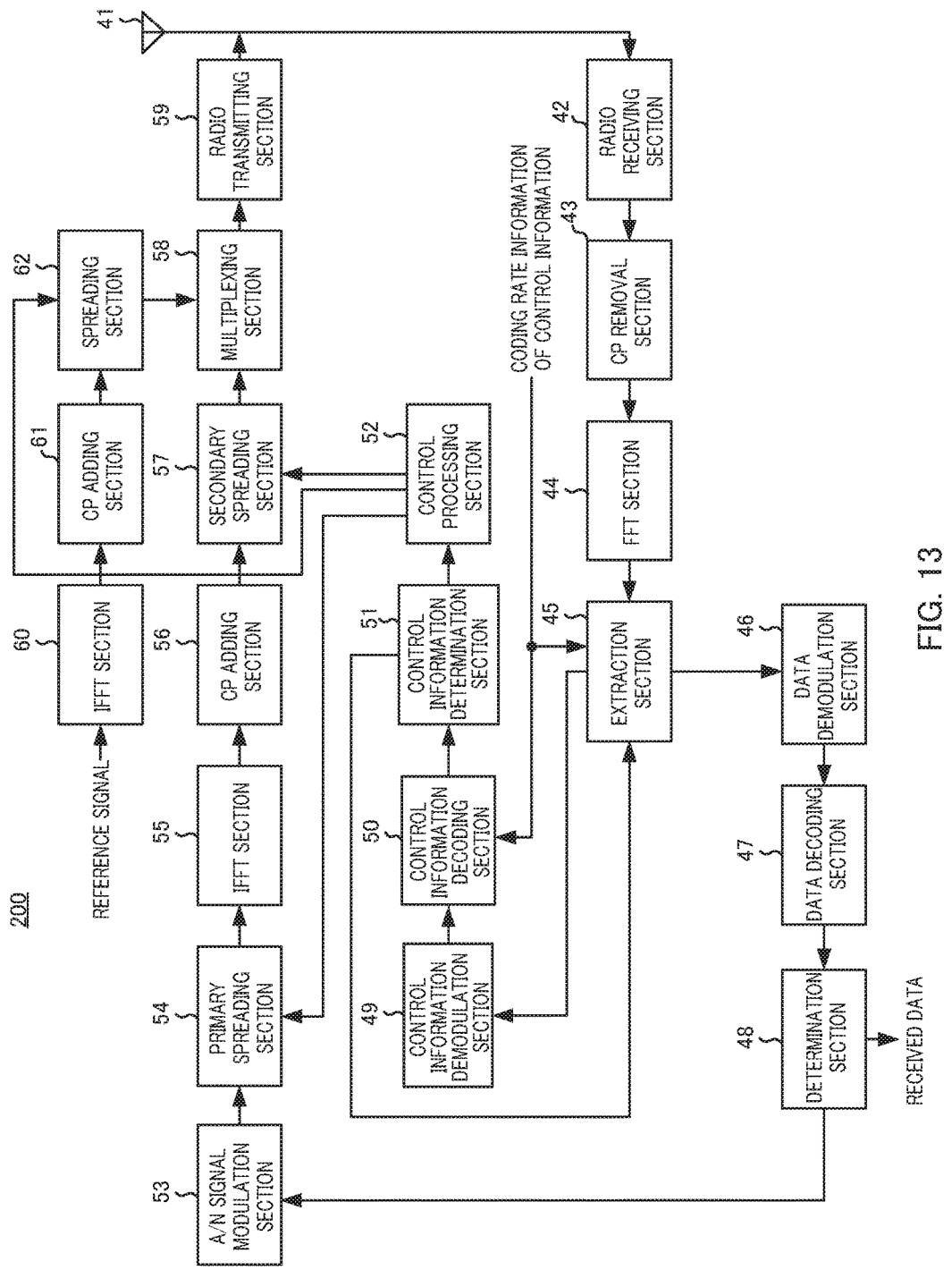
FIG. 13 is a block diagram illustrating details of the terminal according to the embodiment of the present invention.

FIG. 13 is a block diagram showing the details of terminal 200.

As shown in FIG. 13, specifically, terminal 200 includes antenna 41, radio receiving section 42, CP removal section 43, FFT section 44, extraction section 45, data demodulation section 46, data decoding section 47, determination section 48, control information demodulation section 49, control information decoding section 50, control information determination section 51, control processing section 52, A/N signal modulation section 53, primary spreading section 54, IFFT section 55, CP adding section 56, secondary spreading section 57, multiplexing section 58, and radio transmitting section 59. Terminal 200 also includes IFFT section 60, CP adding section 61, and spreading section 62 for reference signals.

Of the above constituent elements, control processing section 52 mainly functions as control section 220 (FIG. 12). Constituent elements from A/N signal modulation section 53 to radio transmitting section 59 mainly function as transmitting section 210, and constituent elements from radio receiving section 42 to determination section 48 and from radio receiving section 42 to control information determination section 51 mainly function as receiving section 230 (FIG. 12).

Terminal 200 receives, on the downlink, control information mapped onto PDCCH or E-PDCCH, and downlink data mapped onto PDSCH. Terminal 200 transmits PUCCH on the uplink. In this case, to avoid having the description become complex, only the constituent elements related to downlink reception (specifically, PDCCH, E-PDCCH, and PDSCH), which are closely connected with the features of the present embodiment, and related to the uplink transmission (specifically, PUCCH) with respect to the downlink received data are indicated.

Radio receiving section 42 inputs the input from antenna 41 that has received the downlink signal transmitted from base station 100, performs radio demodulation, and outputs the demodulated signal to CP removal section 43.

CP removal section 43 removes the CP from each OFDM symbol time waveform within the subframe and outputs the result to FFT section 44.

FFT section 44 performs an FFT (fast Fourier transform) on the received time waveform in order to perform OFDM (orthogonal frequency division multiplexing) demodulation, thereby obtaining a subframe in the frequency domain. The obtained received subframe is input to extraction section 45.

Extraction section 45 extracts the control information intended for the terminal itself from either the PDCCH region or the E-PDCCH region. Information indicating in which one of the PDCCH and the E-PDCCH the control information is included is specified beforehand from base station 100 (not shown). Note that terminal 200 may observe both PDCCH and E-PDCCH and may be enabled to receive control information irrespective of whether the control information is transmitted by PDCCH or E-PDCCH. Extraction section 45 extracts one or a plurality of control information candidates from a control information region onto which the control information of the terminal itself is possibly mapped, and outputs the candidate to control information demodulation section 49. When a result is obtained from control information determination section 51, extraction section 45 extracts a data signal intended for the terminal from the received subframe based on the resource allocation result included in the control information intended for the terminal. The obtained data signal is input to data demodulation section 46.

Control information demodulation section 49 demodulates one or more input control information and outputs the result to control information decoding section 50.

Control information decoding section 50 decodes the one or more input demodulated sequences using coding rate information of the control information. The decoding result is input to control information determination section 51.

Control information determination section 51 determines, from the one or more decoding results, the control information intended for the terminal, using the terminal ID information. The determination uses, for example, the CRC bit that is masked by the ID information of the terminal itself included in the control information. If there is control information intended for the terminal itself, control information determination section 51 outputs that control information to extraction section 45. Control information determination section 51 outputs the control information to control processing section 52.

Control processing section 52 operates differently between the case of PDCCH terminal 200 and the case of E-PDCCH terminal 200.

In the case of PDCCH terminal 200, control processing section 52 obtains the resource number of the A/N signal based on Equation 1 from the number of the resource (CCE) onto which the control information is mapped. From the obtained A/N signal resource number, control processing section 52 determines the spreading codes used for primary spreading, secondary spreading, and the reference signal, and the frequency resource block (PRB) transmitting the PUCCH. This information is input to primary spreading section 54, secondary spreading section 57, and to spreading section 62 of the reference signal.

On the other hand, in the case of E-PDCCH terminal 200, control processing section 52 identifies an A/N resource to be used for feedback based on setting information of the E-PDCCH set to which the received E-PDCCH control information belongs, A/N resource offset value, setting information of one or a plurality of E-PDCCH sets which is set in terminal 200 but has not been used, minimum eCCE index onto which E-PDCCH is mapped, and ARI value or the like. Control processing section 52 determines each spreading code used for primary spreading, secondary spreading and a reference signal corresponding to the specified A/N resource number, and a frequency resource block (PRB) for transmitting PUCCH. Control processing section 52 outputs each spreading code to primary spreading section 54, secondary spreading section 57, and the reference signal spreading section 62.

Data demodulation section 46 demodulates the input data signal intended for the terminal itself. The result of the demodulation is input to data decoding section 47.

Data decoding section 47 decodes the input demodulated data. The result of the decoding is input to determination section 48.

Determination section 48 uses the CRC masked by the ID of terminal 200 to determine whether or not the decoding result is correct. If the decoding result is correct, determination section 48 outputs the ACK signal to A/N signal modulation section 53 and extracts the received data. If the decoding result is not correct, determination section 48 outputs the NACK signal to A/N signal modulation section 53.

A/N signal modulation section 53, depending upon whether the input signal is ACK or NACK, generates modulated symbols having different values. The generated demodulated symbol is input to primary spreading section 54.

Primary spreading section 54 uses the ZAC sequence input from control processing section 52 to perform primary spreading of the A/N signal and outputs the A/N signal after primary spreading to IFFT section 55. In this case, because the cyclic shift value used for cyclic shift hopping differs in units of SC-FDMA, primary spreading section 54 uses a different cyclic shift value for each SC-FDMA symbol to perform primary spreading of the A/N signal.

IFFT section 55 performs an IFFT of each SC-FDMA symbol input from primary spreading section 54 and outputs the obtained time waveform to CP adding section 56.

CP adding section 56 adds a CP to each input SC-FDMA time waveform and outputs this signal to secondary spreading section 57.

Secondary spreading section 57 uses a block-wise spreading code sequence to perform secondary spreading of the SC-FDMA time waveform the adding the CP. The spreading code used is a code specified by control processing section 52. The stream that has been subjected to secondary spreading is input to multiplexing section 58.

Multiplexing section 58 time-multiplexes the two input sequences received as input from the spreading section 62 for the reference signal and secondary spreading section 57, thereby forming a PUCCH subframe. The time multiplexed signal is input to radio transmitting section 59.

Radio transmitting section 59 performs radio modulation of the input signal to the carrier frequency band and transmits the uplink signal by radio from antenna 41.

IFFT section 60 performs IFFT on the reference signal and outputs the time waveform obtained to CP adding section 61.

CP adding section 61 adds a CP to the time waveform of the input reference signal and outputs this signal to spreading section 62.

Spreading section 62 spreads the time waveform after the adding the CP. The spreading code used is a code specified by control processing section 52. The stream that has been spread is input to multiplexing section 58.

[Operation]

The processing flow of base station 100 and terminal 200 in Embodiment 1 will be described by step (1) through step (7).

Step (1): Base station 100 indicates the use of E-PDCCH to terminal 200 to which control information can be transmitted by E-PDCCH, before transmission and/or reception of PDSCH. Base station 100 need not make particular indication to terminal 200 to which transmission is not performed using the E-PDCCH. If, in particular, there is no indication or recognition is not possible, terminal 200 receives control information while assuming that the control information is transmitted on the PDCCH. Base station 100 indicates setting information of one or a plurality of E-PDCCH sets which is possibly used to terminal 200 to which control information is possibly transmitted using E-PDCCH, before transmission and/or reception of PDSCH. The setting information includes the number of frequency resource blocks (PRBs) included in each E-PDCCH set, frequency position, A/N resource offset value corresponding to each E-PDCCH set, information as to whether the E-PDCCH set is in a localized mode or distributed mode or the like. Here, the localized mode refers to a mode in which eCCE is transmitted by one PRB and the distributed mode refers to a mode in which eCCE is further subdivided into a plurality of components, which are then transmitted while being distributed over two or more PRBs.

Step (2): Base station 100 determines the terminal 200 for assignment of data in each subframe and performs scheduling within the PDSCH. The scheduling uses, in addition to the amount of traffic to each terminal 200, the CSI feedback and sounding reference signal (SRS) transmitted by terminal 200 and the like.

Step (3): Base station 100 generates control information including the scheduling result intended for each terminal

200 and schedules the control information onto PDCCH or E-PDCCH. For terminal 200 for which a plurality of E-PDCCH sets are set, base station 100 determines an E-PDCCH set for transmitting E-PDCCH and schedules the control information in the E-PDCCH set.

Base station 100 confirms whether or not collision of A/N resources occurs among all terminals 200 for which control information is scheduled. When collision of A/N resources occurs, base station 100 gives a dynamic offset included in E-PDCCH control information and thereby examines whether or not it is possible to avoid collision of A/N resources. When it is possible to avoid collision, base station 100 indicates the dynamic offset to terminal 200. When it is not possible to avoid collision of A/N resources even using ARI, base station 100 leaves one of the plurality of terminals 200 in which collision occurs and abandons scheduling for remaining terminals 200 (allocated block).

The value offset by ARI varies depending on one or a plurality of E-PDCCH sets set for target terminal 200, a setting of each dynamic A/N region corresponding thereto and a setting of the E-PDCCH set by which E-PDCCH control information is actually transmitted. Hereinafter, the value offset by ARI for each condition will be described in detail.

Step (3A): When only one E-PDCCH set is set for target terminal 200 to which E-PDCCH control information is transmitted, base station 100 indicates a small offset value to terminal 200 using ARI. This offset value is predefined, for example, 0 if ARI=0 and +16 if ARI=1 or the like when ARI has 1 bit.

Step (3B): Although base station 100 sets a plurality of E-PDCCH sets for target terminal 200 to which E-PDCCH control information is transmitted, if a dynamic A/N region corresponding to an E-PDCCH set to which the E-PDCCH control information transmitted belongs does not overlap with a dynamic A/N region corresponding to another E-PDCCH set set for terminal 200, base station 100 indicates, to terminal 200, a small offset value by ARI as is the case where only one E-PDCCH set is set. This offset value is, for example, 0 if ARI=0 or +1 if ARI=1 when ARI has 1 bit.

Step (3C): When base station 100 sets a plurality of E-PDCCH sets for target terminal 200 to which E-PDCCH control information is transmitted, if a dynamic A/N region corresponding to an E-PDCCH set to which the E-PDCCH control information transmitted belongs overlaps with a dynamic A/N region corresponding to another E-PDCCH set set for terminal 200, base station 100 indicates a large offset value to terminal 200 by ARI. This offset value is, for example, 0 if ARI=0 or +16 if ARI=1 when ARI has 1 bit.

As described above, in step (3), the value of ARI is changed depending on whether or not a dynamic A/N region corresponding to the E-PDCCH set by which E-PDCCH control information of terminal 200 is transmitted overlaps with the dynamic A/N region corresponding to another E-PDCCH set set for same terminal 200. When the dynamic A/N regions do not overlap with each other, the offset value of ARI is set to a small value, whereas when A/N regions overlap with each other, the offset value of ARI is set to a large value.

Step (4): Upon completion of scheduling of control information for all terminals 200, base station 100 transmits, by radio, control information of PDCCH and E-PDCCH, and downlink data of PDSCH over the downlink.

Step (5): Terminal 200 obtains control information intended for terminal 200 itself from the received signal, extracts and decodes a data signal. Terminal 200 identifies code and frequency resources with which an A/N signal corresponding to the received data signal is transmitted based on the control information. Especially, E-PDCCH terminal 200 identifies A/N resources in the following way.

Step (6): E-PDCCH terminal 200 first examines whether one or a plurality of dynamic A/N regions corresponding to one or a plurality of E-PDCCH sets set for terminal 200 itself overlap with each other. E-PDCCH terminal 200 changes the dynamic offset value read by ARI depending on whether or not the dynamic A/N region corresponding to the E-PDCCH set to which the received E-PDCCH control information belongs overlaps with the dynamic A/N region of the other E-PDCCH set.

Step (6A): E-PDCCH terminal 200 for which only one E-PDCCH set is set determines A/N resources assuming that the dynamic offset by ARI has a small value. The "small offset" is, for example, 0 if ARI=0 or +1 if ARI=1 when ARI has 1 bit, which is a predefined value.

Step (6B): E-PDCCH terminal 200 for which a plurality of E-PDCCH sets are set but a dynamic A/N region corresponding to an E-PDCCH set to which the received E-PDCCH control information belongs does not overlap with a dynamic A/N region corresponding to another E-PDCCH set, determines A/N resources assuming that the dynamic offset value by ARI has a small value as is the case with E-PDCCH terminal 200 for which only one E-PDCCH set is set. The "small offset" is, for example, 0 if ARI=0 or +1 if ARI=1 when ARI has 1 bit, which is a predefined value.

Step (6C): E-PDCCH terminal 200 for which a plurality of E-PDCCH sets are set and a dynamic A/N region corresponding to an E-PDCCH set to which the received E-PDCCH control information belongs overlaps with a dynamic A/N region corresponding to another E-PDCCH set, determines A/N resources assuming that the dynamic offset value by ARI has a large value. The "large offset" is, for example, 0 if ARI=0 or +16 if ARI=1 when ARI has 1 bit, which is a predefined value.

Step (7): Terminal 200 identifies ACK or NACK according to the data signal determination result and transmits an A/N signal using the A/N resources (code and frequency resources) identified as described above.

[Effects]

As described above, according to base station 100 and terminal 200 according to the present embodiment, an offset value of ARI is changed depending on whether or not a dynamic A/N region corresponding to an E-PDCCH set by which control information is transmitted overlaps with another dynamic A/N region. This allows an appropriate ARI offset value to be set according to the number of terminals or traffic.

For example, when the number of terminals is large, the number of A/N signals included in each of the dynamic A/N regions corresponding to a plurality of E-PDCCH sets increases. Therefore, when operation is performed such that dynamic A/N regions overlap with each other, collision of A/N resources frequently occurs, and therefore it may be possible to consider operation that uses an A/N resource offset by a higher layer so that different dynamic A/N regions are set so as not to overlap with each other.

When a dynamic A/N region does not overlap with another dynamic A/N region, if the ARI offset is set to a large value, the number of uplink resources available to PUSCH may further decrease. According to the present embodiment, when there is no overlap between dynamic A/N regions, the offset by ARI is set to a small value, and therefore even when offsets are summed, it is possible to minimize an increase in the PUCCH overhead, that is, minimize a reduction in the amount of uplink resources available to PUSCH. FIG. 14A shows an example where a dynamic offset by ARI according to the present embodiment is used when two E-PDCCH sets (1) and (2) are set and dynamic A/N regions are operated so as not to overlap with each other.

Furthermore, for example, when the number of terminals is small, the number of A/N signals included in respective dynamic A/N regions corresponding to a plurality of E-PDCCH sets decreases. Therefore, when operation is performed such that dynamic A/N regions do not overlap with each other, the A/N resource utilization efficiency deteriorates, and therefore it may be possible to consider operation that uses an A/N resource offset by a higher layer so that different dynamic A/N regions are set so as to overlap with each other.

As shown above, when a dynamic A/N region overlaps with another dynamic A/N region, if only a small offset is given by ARI, A/N resources need to be selected within dynamic A/N regions and it may be impossible to avoid collision of A/N resources. When dynamic A/N regions overlap with each other, the present embodiment adopts a large offset value by ARI, and can thereby increase the probability of being able to avoid collision of A/N resources using ARI. FIG. 14B shows an example where a dynamic offset by ARI according to the present embodiment is used when two E-PDCCH sets (1) and (2) are set and dynamic A/N regions are operated so as not to overlap with each other.

According to the present embodiment, an appropriate offset of ARI is changed depending on an operation situation of the E-PDCCH set and parameters, and therefore no additional signaling is required compared to a method that changes the ARI offset value through indication from a higher layer such as RRC. This makes it possible to select an appropriate offset by ARI without increasing the overhead on the downlink.

Note that when dynamic A/N regions corresponding to three or more E-PDCCH sets simultaneously overlap with each other, the dynamic offset value of ARI may be determined according to the same rule as that of the present embodiment.

Meanwhile, when dynamic A/N regions corresponding to three or more E-PDCCH sets simultaneously overlap with each other, the dynamic offset value of ARI may be set to a large value only when the dynamic A/N region corresponding to the E-PDCCH set by which E-PDCCH control information is transmitted overlaps with a dynamic A/N region corresponding to a specific E-PDCCH set. In other words, the dynamic offset value of ARI may be set assuming that the dynamic A/N region corresponding to the E-PDCCH set by which E-PDCCH control information is transmitted does not overlap unless it overlaps with a dynamic A/N region corresponding to a specific E-PDCCH set.

By so doing, the dynamic offset value of ARI can be set to a small value unless a specific dynamic A/N region overlaps, and it is thereby possible to reduce an increase in unnecessary PUCCH overhead.

(Variation 1)

When a plurality of E-PDCCH sets are set and a dynamic A/N region corresponding to an E-PDCCH set to which E-PDCCH control information belongs overlaps with a dynamic A/N region corresponding to the set other E-PDCCH set, the dynamic offset value by ARI is determined so as to be the same as a function of the total number of A/N resources of a dynamic A/N region corresponding to the E-PDCCH set to which the received E-PDCCH control information belongs, for example, the total number of A/N resources included in the dynamic A/N region or the total number of A/N resources included in the dynamic A/N region plus a constant. Here, the total number of A/N resources is a value uniquely determined by the number of PRBs included in the E-PDCCH set to which the E-PDCCH control information belongs and the number of eCCEs per PRB.

In variation 1, when only one E-PDCCH set is set or when a plurality of E-PDCCH sets are set, but the dynamic A/N region corresponding to the E-PDCCH set by which E-PDCCH control information is transmitted and/or received does not overlap with the dynamic A/N region corresponding to the set other E-PDCCH set, if the dynamic offset by ARI has a small value as in the case of the present embodiment, for example, 0 if ARI=0 and +1 if ARI=1 when ARI has 1 bit.

Figure 15:
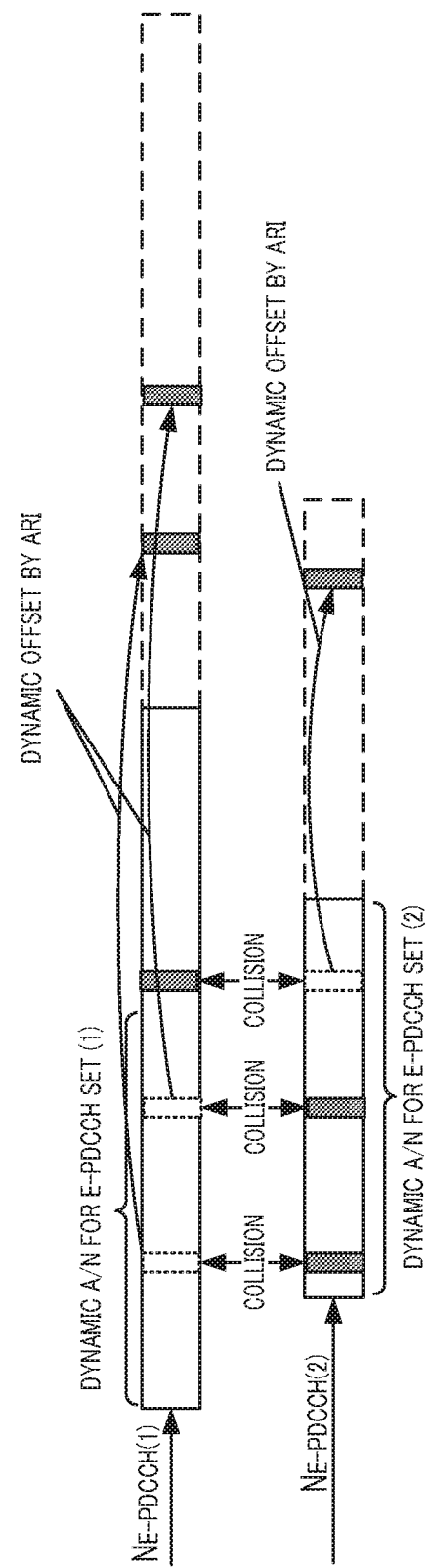
FIG. 15 is a diagram illustrating offset values added by ARI according to variation 1 of the embodiment of the present invention.

By so doing, it is possible to appropriately set the dynamic offset value by ARI according to the setting of the E-PDCCH set. When the number of PRBs included in the E-PDCCH set can be set by a higher layer and can also be set to a different value by the E-PDCCH set, the scale of the corresponding dynamic A/N region may also differ from one E-PDCCH set to another. As in the case of the aforementioned embodiment, when the dynamic offset value by ARI is fixed in the case of overlapping, it is not possible to cover various scales of dynamic A/N regions. For example, when the scale of a dynamic A/N region is sufficiently greater than the dynamic offset value by ARI, if an offset is added, collision with A/N resources of another terminal 200 may occur. Conversely, when the scale of a dynamic A/N region is sufficiently smaller than the dynamic offset value by ARI, if an offset is added, an increase in the overhead is large. Therefore, by changing the dynamic offset value of ARI according to the scale of the dynamic A/N region, it is possible to suppress the amount of reduction of resources of PUSCH while reducing the probability of collision of A/N resources. FIG. 15 illustrates an example of a case where E-PDCCH sets (1) and (2) for which two different numbers of PRBs are set are operated, both dynamic A/N regions overlap with each other and collision of A/N resources is avoided by ARI using the method of variation 1.

(Variation 2)

When a plurality of E-PDCCH sets are set and a dynamic A/N region corresponding to an E-PDCCH set to which E-PDCCH control information belongs overlaps with a dynamic A/N region corresponding to the set other E-PDCCH set, the dynamic offset value of ARI is changed according to the amount of resources corresponding to regions where the dynamic A/N region corresponding to the E-PDCCH set to which the received E-PDCCH control information belongs overlaps with the set other dynamic A/N region.

By so doing, when dynamic A/N regions partially overlap with each other, it is possible to set an appropriate dynamic offset. For example, when two E-PDCCH sets (1) and (2) are operated and both dynamic A/N regions partially overlap with each other, if a large offset is made by ARI, the PUCCH overhead increases. Therefore, changing the offset value according to the scale of the overlapping parts makes it possible to avoid collision without causing an excessive increase in the overhead.

As a more specific offset value, a number equal to the number of overlapping A/N resources or the number equal to the number of overlapping A/N resources plus a constant may be used. FIG. 16A illustrates an example where two E-PDCCH sets (1) and (2) are set and corresponding dynamic A/N regions partially overlap with each other. In this example, a state in which all A/N resources of a dynamic A/N region corresponding to E-PDCCH set (2) are offset by ARI corresponds to a state in which the PUCCH overhead becomes a maximum. In the method of variation 2, as shown in FIG. 16B, a state in which the PUCCH overhead has become a maximum is the same as a state when dynamic A/N regions corresponding to two E-PDCCH sets (1) and (2) do not overlap with each other and are arranged on neighboring uplink resources. This is overhead smaller than that in variation 1 in which the offset value of ARI is equal to the total number of A/N resources of dynamic A/N regions.

As described above, in variation 2, in the operation in which a plurality of dynamic A/N regions partially overlap with each other, the offset by ARI can be set to an appropriate value to suppress an increase in overhead.

In variation 2, the offset value by ARI may be made variable depending on a positional relationship between dynamic A/N regions. That is, in the dynamic A/N region where the A/N resource at the end of the dynamic A/N region has a smaller index than that of the A/N resource at the end of the overlapping dynamic A/N region (dynamic A/N corresponding to E-PDCCH set (1) in FIG. 16A), the value of ARI may be set to a small value, that is, 0 if ARI=0 and +1 if ARI=1 or the like when ARI has 1 bit.

By so doing, it is possible to adopt operation using an E-PDCCH set corresponding to the dynamic A/N region having a small A/N resource index at the end of the plurality of partially overlapping dynamic A/N regions mainly for multiuser MIMO. That is, since the offset value of ARI can be made variable from one E-PDCCH set to another, operation can also be made variable from one E-PDCCH set to another.

(Variation 3)

When a plurality of E-PDCCH sets are set and a dynamic A/N region corresponding to the E-PDCCH set to which E-PDCCH control information belongs overlaps with a dynamic A/N region corresponding to the set other E-PDCCH set, the dynamic offset value of ARI is changed according to the difference between the A/N resource offset set in the dynamic A/N region corresponding to the E-PDCCH set to which the received E-PDCCH control information belongs and the A/N resource offset set for the other dynamic A/N region that overlaps therewith.

In variation 2, when dynamic A/N regions partially overlap with each other, although an appropriate dynamic offset can be set, the amount of mutually overlapping dynamic A/N resources needs to be calculated, which imposes a calculation load on terminal 200. On the other hand, as in the case of variation 3, determining the dynamic offset value of ARI only from the difference in A/N resource offsets eliminates the necessity for calculations of the amount of overlapping resources, and terminal 200 of a simpler configuration can thereby obtain equivalent effects. Particularly when the overlapping dynamic A/N regions have the same scale, the effect of variation 3 has the same as that of variation 2.

(Variation 4)

Figure 17:
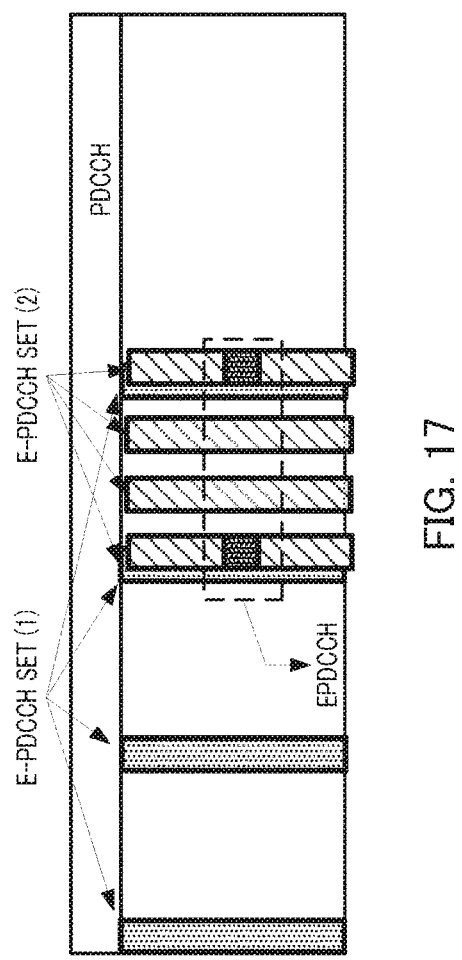
FIG. 17 is a diagram illustrating an example where E-PDCCH according to the embodiment of the present invention is transmitted by PRBs belonging to a plurality of different E-PDCCH sets.

When a plurality of E-PDCCH sets are set, specific downlink PRBs may simultaneously belong to a plurality of E-PDCCH sets. FIG. 17 illustrates an example. In FIG. 17, two E-PDCCH sets (1) and (2) are set and E-PDCCH control information is transmitted and/or received by PRBs that belong to both E-PDCCH sets. In such a case, terminal 200 cannot determine to which E-PDCCH set the received E-PDCCH control information belongs. In such a case, it is not clear which one is an A/N resource offset, and so terminal 200 cannot determine A/N resources for transmitting an A/N signal. Moreover, terminal 200 cannot determine a dynamic offset value by ARI.

Thus, in variation 4, terminal 200 receives E-PDCCH control information from PRBs that simultaneously belong to a plurality of E-PDCCH sets and if it is not possible to determine to which E-PDCCH set it belongs, terminal 200 determines A/N resources of dynamic A/N regions corresponding to the plurality of E-PDCCH sets and determines an A/N resource as a resource included in the dynamic A/N region farthest from the PUSCH resource region. The dynamic offset value of ARI is determined based on whether or not the dynamic A/N region overlaps with another dynamic A/N region.

By so doing, it is possible to transmit an A/N signal corresponding to E-PDCCH control information transmitted by PRBs, to which E-PDCCH set these PRBs belong cannot be determined, using A/N resources having a small influence of an increase in overhead and suppress a reduction of PUSCH resources.

[Variation 1]

When a plurality of E-PDCCH sets are set, if the respective E-PDCCH sets have different numbers of PRBs, the corresponding dynamic A/N regions have different scales. In such a case, when the dynamic A/N region corresponding to the E-PDCCH set to which control information belongs overlaps with the dynamic A/N region corresponding to the set other E-PDCCH set, the dynamic offset value of ARI is changed according to the scale of the dynamic A/N region to be overlapped therewith. Particularly, the greater the dynamic A/N region to be overlapped therewith, the smaller dynamic offset value of ARI is set for the dynamic A/N region corresponding to the E-PDCCH set in which E-PDCCH control information is included.

In the case of operation in which the number of terminals accommodated in E-PDCCH does not significantly change depending on the set, the greater the dynamic A/N region, the smaller the density of A/N resources accommodated becomes. In other words, when dynamic A/N regions overlap with each other, the probability that collision of A/N resources would occur decreases. Therefore, the probability of collision of A/N resources does not increase even when the dynamic offset value of ARI is decreased when the dynamic A/N region to be overlapped therewith is relatively large. Therefore, it is possible to reduce the dynamic offset value of ARI and avoid an increase in overhead of PUCCH resources.

The greater the dynamic A/N region to be overlapped therewith, the further the dynamic offset value of ARI may be increased for the dynamic A/N region corresponding to the E-PDCCH set containing E-PDCCH control information.

The greater the dynamic A/N region, the greater the number of accommodatable A/N resources becomes. Therefore, when the greater the number of PRBs included in the E-PDCCH set, the more dynamic A/N regions overlap with each other, the probability of collision of A/N resources does not decrease. Therefore, increasing the dynamic offset value of ARI when the dynamic A/N region to be overlapped therewith is relatively large makes it possible to reliably avoid collision of A/N resources.

[Variation 2]

In the communication system, both PDCCH and E-PDCCH may be simultaneously operated.

In such a case, a dynamic A/N corresponding to PDCCH is mixed with a dynamic A/N corresponding to E-PDCCH. As described above, an A/N resource of the dynamic A/N corresponding to PDCCH is determined by equation 1.

The dynamic A/N region of PDCCH and the dynamic A/N region of E-PDCCH may overlap with each other depending on the A/N resource offsets of PDCCH and E-PDCCH and the total amount of A/N resources included in the dynamic A/N regions.

Thus, E-PDCCH terminal 200 may receive control information PCFICH indicating the size of PDCCH included in a downlink subframe, identify a dynamic A/N region corresponding to PDCCH, examine whether or not the dynamic A/N region corresponding to the E-PDCCH set containing the E-PDCCH control information overlaps with the dynamic A/N region corresponding to PDCCH, and cause the offset value of ARI to vary according to the result.

When the dynamic A/N region corresponding to the E-PDCCH set containing E-PDCCH control information overlaps with the dynamic A/N region corresponding to PDCCH, it is possible to reliably avoid collision of A/N resources by setting the offset value of ARI to a large value. On the other hand, when the dynamic A/N region corresponding to the E-PDCCH set containing E-PDCCH control information does not overlap with the dynamic A/N region corresponding to PDCCH, it is possible to suppress an increase in overhead of PUCCH by setting the offset value of ARI to a small value. That is, it is possible to obtain the same effect as that of the above embodiment between the dynamic A/N region corresponding to the E-PDCCH set containing the E-PDCCH control information and the dynamic A/N region corresponding to PDCCH.

[Variation 3]

Although 0 and positive values (+1, +16 or the like) have been shown as examples of dynamic offsets in the above embodiment, the values of dynamic offsets may also be negative values (−1, −16 or the like).

The greater the number of the A/N resource used, the greater the overhead becomes, causing the number of resources of PUSCH to decrease. Therefore, the more positive offsets are given to A/N resource numbers by ARI, the greater the overhead of PUCCH becomes. Thus, using negative values for the dynamic offsets can reduce the degree of reduction in the amount of resources of PUSCH.

[Variation 4]

In the above embodiment, when the dynamic A/N region corresponding to the E-PDCCH set by which E-PDCCH control information is transmitted does not overlap with the dynamic A/N region corresponding to the set other E-PDCCH set, 0 or an offset having a small value is added to the A/N resource number by ARI. However, in this case, instead of adding a dynamic offset, the sign of a secondary spreading sequence (block-wise spreading sequence) may be changed among frequency resource blocks (PRBs), primary spreading sequence and secondary spreading sequence (block-wise spreading sequence) determined by A/N resources which are determined as having no offset. That is, for example, when ARI has 1 bit, A/N resources determined with no offset are used as they are if ARI=0, and a secondary spreading sequence of A/N resources determined with no offset is replaced by a spreading sequence orthogonal thereto if ARI=1.

When an offset of an A/N resource is small, there is a high possibility that A/N resources of a plurality of terminals may be multiplexed with a primary spreading sequence with the same PRB. However, since multiplexing using a cyclic shift is used for the primary spreading sequence, there will be no problem while a delay spread difference is small among multiplexed terminals, but when the delay spread difference is large, interference remains between A/N signals.

On the other hand, since the secondary spreading code is a block-wise spreading sequence, terminals having a large delay spread difference can also be separated apart by reducing the influence of interference during despreading.

Therefore, by using the method of variation 4, when dynamic A/N regions do not overlap with each other, in operation in which multiuser MIMO is applied to terminals 200 having a large delay spread difference, it is possible to perform multiplexing using the secondary spreading sequence having less interference and multiplex A/N signals with higher quality.

PRBs remain unchanged if only the secondary spreading sequence is replaced, so that PUCCH overhead does not increase, either. Therefore, it is possible to adopt a large amount of PUSCH resources and prevent the uplink throughput from deteriorating.

[Variation 5]

In the above embodiment, when a plurality of E-PDCCH sets are set, the dynamic offset value of ARI is changed according to the overlapping relationship between the respective dynamic A/N regions. However, the ARI offset value may also be changed according to the absolute value of the A/N resource offset of the dynamic A/N region corresponding to the E-PDCCH set by which E-PDCCH control information is transmitted and/or received irrespective of the overlapping relationship of other dynamic A/N regions.

The greater the A/N resource offset value, the higher the probability that the amount of PUSCH resources may be reduced. Conversely, the smaller the A/N resource offset value, the higher the probability of overlapping with dynamic A/N regions of PDCCH or dynamic A/N regions of other E-PDCCH sets becomes, and therefore the probability of collision of A/N resources increases. Therefore, by reducing the dynamic offset value of ARI as the A/N resource offset value increases, it is possible to reduce the amount of reduction of PUSCH resources when avoiding collision of A/N resources. On the other hand, by increasing the dynamic offset value of ARI as the A/N resource offset value decreases, it is possible to increase the probability of avoiding collision of A/N resources.

An example of a case where ARI has 1 bit has been described so far, but ARI may have 2 or more bits. For example, when ARI has 2 bits, one of four values may be associated with 0 (no offset) and another one value may be associated with the aforementioned dynamic offset addition, and it is thereby possible to implement the embodiments and variations or modifications thereof described so far. The remaining two values may be values indicating fixed offsets or values indicating offset values obtained by a function of dynamic offset values shown in the embodiments and variations or modifications thereof described so far.

Thus, by increasing the number of ARI bits, it is possible to have other dynamic offset candidates while achieving the aforementioned effects and thereby further reduce the probability of collision of A/N resources.

Furthermore, the dynamic offset value of ARI may also be changed depending on whether the E-PDCCH set by which E-PDCCH control information is transmitted and/or received is in a distributed mode or localized mode. In other words, the dynamic offset value by ARI may be changed depending on four conditions of whether or not the dynamic A/N region corresponding to the E-PDCCH set by which E-PDCCH control information is transmitted and/or received overlaps with the dynamic A/N region corresponding to the set other E-PDCCH set and whether the E-PDCCH set by which E-PDCCH control information is transmitted/received is in a distributed mode or localized mode. Here, the distributed mode refers to a mode in which each enhanced control channel element (eCCE) making up E-PDCCH control information is further subdivided into smaller element blocks and transmitted spread over one or a plurality of PRBs making up an E-PDCCH set. The localized mode refers to a mode in which each eCCE is arranged closed within a single PRB making up an E-PDCCH set (that is, not spread). The distributed mode has a high possibility of being used as E-PDCCH that can be received by various terminals 200 irrespective of the channel condition or receiving quality and the localized mode has a high possibility of being used for terminals 200 having a good channel condition or good receiving quality in a specific frequency band.

For example, the dynamic offset value of ARI may be increased when E-PDCCH control information belongs to an E-PDCCH set in a distributed mode and the dynamic offset value of ARI may be decreased when E-PDCCH control information belongs to an E-PDCCH set in a localized mode.

By so doing, an appropriate ARI dynamic offset can be set according to the transmission mode of an E-PDCCH set. That is, the distributed mode assumes that terminals 200 having a poor condition can receive E-PDCCH control information, and needs to be able to accommodate terminals having a greater delay spread. Therefore, by setting the dynamic offset to a greater value, it is possible to increase the distance between A/N resources and arrange A/N resources so as not to interfere with each other even with a greater delay spread. On the other hand, the localized mode assumes that only terminals 200 having a good channel condition or good receiving quality can receive E-PDCCH control information and there is a high possibility that terminals having a large delay spread may not exist. Therefore, by setting the dynamic offset to a smaller value, it is possible to reduce the distance between A/N resources and arrange A/N resources so as to be able to accommodate A/N signals of more terminals with higher efficiency.

A case has been described above where E-PDCCH sets by which E-PDCCH control information is transmitted and/or received are independent of each other, but the E-PDCCH sets may have an inclusion relation. That is, when two E-PDCCH sets (1) and (2) are set, all PRBs included in E-PDCCH set (1) may also be included in E-PDCCH set (2) (E-PDCCH set (1) may be a subset of E-PDCCH set (2)).

In such a case, all PRBs belong to E-PDCCH set (2) and when E-PDCCH control information is transmitted using PRBs belonging to both of the two E-PDCCH sets, the dynamic offset value of ARI may be assumed to be the dynamic offset value corresponding to E-PDCCH set (1) and when E-PDCCH is transmitted using PRBs belonging to only E-PDCCH set (2), the dynamic offset value of ARI may be assumed to be the dynamic offset value corresponding to E-PDCCH set (2). It is thereby possible to take different ARI offset values depending on PRBs used and increase the degree of freedom of A/N resource control.

The embodiments of the present invention have been describes so far.

In the embodiments described above, the present invention is described using an example of a case where the present invention is implemented as hardware. However, the present invention can be achieved by software in concert with hardware.

The functional blocks described in the embodiments described above are achieved by an LSI, which is typically an integrated circuit. The functional blocks may be provided as individual chips, or part or all of the functional blocks may be provided as a single chip. Depending on the level of integration, the LSI may be referred to as an IC, a system LSI, a super LSI, or an ultra LSI.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

<Overview of Aspects of Invention>

Next, an overview of aspects according to the present disclosure will be described.

A first aspect of the present disclosure provides a radio communication terminal including: a receiving section that receives a control signal including an ACK/NACK index (ARI: ACK/NACK Resource Indicator) via any one E-PDCCH set among one or a plurality of E-PDCCH sets; a control section that determines an offset value indicated by the ARI depending on whether or not a resource region usable for a dynamic ACK/NACK resource corresponding to the E-PDCCH set via which the control signal has been received overlaps with a resource region useable for a dynamic ACK/NACK resource corresponding to another E-PDCCH set and that gives an offset to the ACK/NACK resource according to the ARI value; and a transmitting section that transmits an ACK/NACK signal using the determined ACK/NACK resource.

According to the first aspect, although a dynamic A/N region corresponding to an E-PDCCH set via which E-PDCCH control information is transmitted and/or received is set, it is possible to switch the dynamic offset value by ARI depending on whether or not the dynamic A/N regions overlaps with a dynamic A/N region corresponding to another E-PDCCH set. Through this switching, when a plurality of dynamic A/N regions overlap with each other, it is possible to reduce the offset value indicated by ARI and suppress a further increase in PUCCH overhead, and when a plurality of dynamic A/N regions do not overlap with each other, it is possible to avoid collision of A/N resources by increasing the offset value indicated by ARI. Therefore, it is possible to contribute to avoidance of collision of A/N resources and suppression of PUCCH overhead according to the operation situation of dynamic A/N regions. Furthermore, these can be implemented without additional signaling.

A second aspect of the present disclosure provides the radio communication terminal according to the first aspect, in which, when the resource region usable for a dynamic ACK/NACK resource corresponding to the E-PDCCH set via which the control signal has been received overlaps with the resource region usable for a dynamic ACK/NACK resource corresponding to the other E-PDCCH set, the control section determines the offset value indicated by the ARI to be identical to the resource region usable for the dynamic ACK/NACK resource corresponding to the E-PDCCH set via which the control signal has been received or a resource region obtained by adding a constant to the resource region usable for the dynamic ACK/NACK resource corresponding to the E-PDCCH set via which the control signal has been received, and thereby determines the ACK/NACK resource for transmitting an ACK/NACK signal.

According to the second aspect, it is possible to determine an appropriate ARI offset value for achieving a reduction in a probability of collision of A/N resources according to the scale of dynamic A/N regions that may vary depending on the number of PRBs included in the E-PDCCH set without excessively increasing overhead of PUCCH resources. Furthermore, this can be implemented without additional signaling.

A third aspect of the present disclosure provides the radio communication terminal according to the first aspect, in which, when the resource region usable for a dynamic ACK/NACK resource corresponding to the E-PDCCH set via which the control signal has been received overlaps with the resource region usable for a dynamic ACK/NACK resource corresponding to the other E-PDCCH set, the control section determines the offset value indicated by the ARI according to a number of overlapping resources between the dynamic ACK/NACK resource corresponding to the E-PDCCH set via which the control signal has been received and the resource region usable for the dynamic ACK/NACK resource corresponding to the other E-PDCCH set and thereby determines the ACK/NACK resource for transmitting an ACK/NACK signal.

According to the third aspect, when dynamic A/N regions corresponding to E-PDCCH control information partially overlap with each other, it is possible to determine an appropriate ARI offset value for achieving a reduction in the probability of collision of A/N resources without excessively increasing overhead of PUCCH resources. Furthermore, this can be implemented without additional signaling.

A fourth aspect of the present disclosure provides the radio communication terminal according to the first aspect, in which, when the resource region usable for a dynamic ACK/NACK resource corresponding to the E-PDCCH set via which the control signal has been received overlaps with the resource region usable for a dynamic ACK/NACK resource corresponding to the other E-PDCCH set, the control section determines the offset value indicated by the ARI based on a difference between an ACK/NACK resource offset value indicated from a higher layer in correspondence to the E-PDCCH set via which the control signal has been received and an ACK/NACK resource offset value indicated from the higher layer in correspondence to the other E-PDCCH set and thereby determines the ACK/NACK resource for transmitting an ACK/NACK signal.

According to the fourth aspect, it is possible to derive an appropriate dynamic offset value by ARI with fewer calculation processes when dynamic A/N regions corresponding to E-PDCCH control information partially overlap with each other. Furthermore, this can be implemented without additional signaling.

A fifth aspect of the present disclosure provides the radio communication terminal according to the first aspect, in which, when the resource region usable for a dynamic ACK/NACK resource corresponding to the E-PDCCH set via which the control signal has been received overlaps with the resource region usable for a dynamic ACK/NACK resource corresponding to the other E-PDCCH set, and the overlapping resource regions are different in size, the control section determines the offset value indicated by the ARI according to the size of the overlapping resource regions and thereby determines the ACK/NACK resource for transmitting an ACK/NACK signal.

According to the fifth aspect, even when the A/N regions corresponding to a plurality of E-PDCCH sets are different in size, it is possible to set an offset capable of reliably avoiding collision. Furthermore, this can be implemented without additional signaling.

A sixth aspect of the present disclosure provides the radio communication terminal according to the first aspect, in which, when the resource region useable for a dynamic ACK/NACK resource corresponding to the E-PDCCH set via which the control signal has been received overlaps with the resource region useable for a dynamic ACK/NACK resource corresponding to PDCCH, the control section determines the offset value indicated by the ARI according to a size of the region usable for the dynamic ACK/NACK resource corresponding to the PDCCH set and thereby determines the ACK/NACK resource for transmitting an ACK/NACK signal.

According to the sixth aspect, even when a dynamic A/N region corresponding to E-PDCCH and a dynamic A/N region corresponding to PDCCH overlap with each other and are operated, it is possible to give an appropriate offset by ARI and avoid collision. Furthermore, this can be implemented without additional signaling.

A seventh aspect of the present disclosure provides the radio communication terminal according to the first aspect, in which, the offset value indicated by the ARI is set to a negative value.

According to the seventh aspect, since the offset indicated by ARI does not reduce PUSCH resources, it is possible to avoid collision of A/N resources without increasing overhead.

An eighth aspect of the present disclosure provides the radio communication terminal according to the first aspect, in which, when the resource region usable for a dynamic ACK/NACK resource corresponding to the E-PDCCH set via which the control signal has been received does not overlap with the resource region usable for a dynamic ACK/NACK resource corresponding to the other E-PDCCH set or PDCCH, the control section determines, in accordance with the ARI value, whether or not a secondary spreading sequence (block-wise spreading sequence) corresponding to an ACK/NACK resource of a dynamic ACK/NACK determined with no offset by the ARI is replaceable with an orthogonal code orthogonal to the secondary spreading sequence.

According to the eighth aspect, when the dynamic A/N region corresponding to the E-PDCCH set via which E-PDCCH control information has been transmitted and/or received does not overlap with another dynamic A/N region, it is possible to change an orthogonal code of a secondary spreading sequence by ARI. It is thereby possible to multiplex terminals having a large delay spread difference with the same PRB with different codes, for which it has been conventionally difficult to perform multiplexing by only adding a small dynamic offset by ARI. Therefore, it is possible to realize a combination of terminals 200 in more flexible multiuser MIMO and increase the degree of freedom of scheduling.

A ninth aspect of the present disclosure provides the radio communication terminal according to the first aspect, in which, the control section determines the dynamic offset value of the ARI according to an absolute value of an A/N resource offset parameter indicating a start position of the resource region usable for a dynamic ACK/NACK resource corresponding to the E-PDCCH set via which the control signal has been received and determines whether or not to add the dynamic offset value according to the ARI value.

According to the ninth aspect, when the absolute value of an A/N resource offset is small and overlapping with another dynamic A/N region is more likely to occur, it is possible to increase the dynamic offset value by ARI and thereby reduce the probability of collision of A/N resources. Meanwhile, when the absolute value of an A/N resource offset is large and the dynamic offset by ARI is more likely to reduce PUSCH resources, it is possible to reduce the dynamic offset value by ARI and suppress the amount of reduction in PUSCH resources. Furthermore, this can be implemented without additional signaling.

A tenth aspect of the present disclosure provides the radio communication terminal according to the first aspect, in which, a number of bits of the ARI is two or more.

According to the tenth aspect, it is possible to dynamically select an A/N resource from among a plurality of A/N resources by ARI and thereby simultaneously reduce PUCCH overhead and collision of A/N resources simultaneously.

An eleventh aspect of the present disclosure provides a base station apparatus including: a control section that determines an offset value indicated by an ACK/NACK index (ARI: ACK/NACK Resource Indicator) according to whether or not a resource region usable for a dynamic ACK/NACK resource corresponding to an E-PDCCH set via which a control signal has been received overlaps with a resource region usable for a dynamic ACK/NACK resource corresponding to another E-PDCCH set and gives an offset to the ACK/NACK resource according to the ARI value; and a transmitting section that transmits the control signal including the ARI via any one E-PDCCH set among one or a plurality of E-PDCCH sets.

According to the eleventh aspect, although a dynamic A/N region corresponding to an E-PDCCH set via which E-PDCCH control information has been transmitted and/or received is set, it is possible to switch the dynamic offset value by ARI depending on whether or not the dynamic A/N region overlaps with a dynamic A/N region corresponding to another E-PDCCH set. Through this switching, when a plurality of dynamic A/N regions overlap with each other, it is possible to reduce the offset value indicated by ARI and suppress a further increase in PUCCH overhead, and when a plurality of dynamic A/N regions do not overlap with each other, it is possible to increase an offset value indicated by ARI and avoid collision of A/N resources. Therefore, it is possible to contribute to avoidance of collision of A/N resources and suppression of PUCCH overhead according to the operation situation of dynamic A/N regions. Furthermore, these can be implemented without additional signaling.

A twelfth aspect of the present disclosure provides the base station apparatus according to the eleventh aspect, in which, when the resource region usable for a dynamic ACK/NACK resource corresponding to the E-PDCCH set via which the control signal has been received overlaps with the resource region usable for a dynamic ACK/NACK resource corresponding to the other E-PDCCH set, the control section determines the offset value indicated by the ARI to be identical to the resource region usable for the dynamic ACK/NACK resource corresponding to the E-PDCCH set via which the control signal has been received or a resource region obtained by adding a constant to the resource region usable for the dynamic ACK/NACK resource corresponding to the E-PDCCH set via which the control signal has been received, and thereby determines the ACK/NACK resource for transmitting an ACK/NACK signal.

According to the twelfth aspect, it is possible to determine an appropriate ARI offset value for achieving a reduction in the probability of collision of A/N resources according to the scale of dynamic A/N regions that may differ depending on the number of PRBs included in the E-PDCCH set without excessively increasing overhead of PUCCH resources. Furthermore, this can be implemented without additional signaling.

A thirteenth aspect of the present disclosure provides the base station apparatus according to the eleventh aspect, in which, when the resource region usable for a dynamic ACK/NACK resource corresponding to the E-PDCCH set via which the control signal has been received overlaps with the resource region usable for a dynamic ACK/NACK resource corresponding to the other E-PDCCH set, the control section determines the offset value indicated by the ARI according to a number of overlapping resources between the dynamic ACK/NACK resource corresponding to the E-PDCCH set via which the control signal has been received and the resource region usable for the dynamic ACK/NACK resource corresponding to the other E-PDCCH set and thereby determines the ACK/NACK resource for transmitting an ACK/NACK signal.

According to the thirteenth aspect, when dynamic A/N regions corresponding to E-PDCCH control information partially overlap with each other, it is possible to determine an appropriate ARI offset value for achieving a reduction in the probability of collision of A/N resources without excessively increasing overhead of PUCCH resources. Furthermore, this can be implemented without additional signaling.

A fourteenth aspect of the present disclosure provides the base station apparatus according to the eleventh aspect, in which, when the resource region usable for a dynamic ACK/NACK resource corresponding to the E-PDCCH set via which the control signal has been received overlaps with the resource region usable for a dynamic ACK/NACK resource corresponding to the other E-PDCCH set, the control section determines the offset value indicated by the ARI based on a difference between an ACK/NACK resource offset value indicated from a higher layer in correspondence to the E-PDCCH set via which the control signal has been received and an ACK/NACK resource offset value indicated from the higher layer in correspondence to the other E-PDCCH set and thereby determines the ACK/NACK resource for transmitting an ACK/NACK signal.

According to the fourteenth aspect, it is possible to derive an appropriate dynamic offset value by ARI with fewer calculation processes when dynamic A/N regions corresponding to E-PDCCH control information partially overlap with each other. Furthermore, this can be implemented without additional signaling.

A fifteenth aspect of the present disclosure provides the base station apparatus according to the eleventh aspect, in which, when the resource region usable for a dynamic ACK/NACK resource corresponding to the E-PDCCH set via which the control signal has been received overlaps with the resource region usable for a dynamic ACK/NACK resource corresponding to the other E-PDCCH set, and the overlapping resource regions are different in size, the control section determines the offset value indicated by the ARI according to the size of the overlapping resource regions and thereby determines the ACK/NACK resource for transmitting an ACK/NACK signal.

According to the fifteenth aspect, even when the dynamic A/N regions corresponding to a plurality of E-PDCCH sets are different in size, it is possible to set an offset capable of reliably avoiding collision. Furthermore, this can be implemented without additional signaling.

A sixteenth aspect of the present disclosure provides the base station apparatus according to the eleventh aspect, in which, when the resource region useable for a dynamic ACK/NACK resource corresponding to the E-PDCCH set via which the control signal has been received overlaps with the resource region useable for a dynamic ACK/NACK resource corresponding to PDCCH, the control section determines the offset value indicated by the ARI according to a size of the region usable for the dynamic ACK/NACK resource corresponding to the PDCCH set and thereby determines the ACK/NACK resource for transmitting an ACK/NACK signal.

According to the sixteenth aspect, even when a dynamic A/N region corresponding to E-PDCCH and a dynamic A/N region corresponding to PDCCH overlap with each other and are operated, it is possible to give an appropriate offset by ARI and avoid collision. Furthermore, this can be implemented without additional signaling.

A seventeenth aspect of the present disclosure provides the base station apparatus according to the eleventh aspect, in which, the offset value indicated by the ARI is set to a negative value.

According to the seventeenth aspect, since the offset indicated by ARI does reduce PUSCH resources, it is possible to avoid collision of A/N resources without increasing overhead.

An eighteenth aspect of the present disclosure provides the base station apparatus according to the eleventh aspect, in which, when the resource region usable for a dynamic ACK/NACK resource corresponding to the E-PDCCH set via which the control signal has been received does not overlap with the resource region usable for a dynamic ACK/NACK resource corresponding to the other E-PDCCH set or PDCCH, the control section determines, in accordance with the ARI value, whether or not a secondary spreading sequence (block-wise spreading sequence) corresponding to an ACK/NACK resource of a dynamic ACK/NACK determined with no offset by the ARI is replaceable with an orthogonal code orthogonal to the secondary spreading sequence.

According to the eighteenth aspect, when the dynamic A/N region corresponding to the E-PDCCH set via which E-PDCCH control information has been transmitted and/or received does not overlap with another dynamic A/N region, it is possible to change an orthogonal code of a secondary spreading sequence by ARI. It is thereby possible to multiplex terminals having a large delay spread difference with the same PRB with different codes, for which it has been conventionally difficult to perform multiplexing by only adding a small dynamic offset by ARI. Therefore, it is possible to realize a combination of terminals 200 in more flexible multiuser MIMO and increase the degree of freedom of scheduling. Furthermore, this can be implemented without additional signaling.

A nineteenth aspect of the present disclosure provides the base station apparatus according to the eleventh aspect, in which, the control section determines the dynamic offset value of the ARI according to an absolute value of an A/N resource offset parameter indicating a start position of the resource region usable for a dynamic ACK/NACK resource corresponding to the E-PDCCH set via which the control signal has been received and determines whether or not to add the dynamic offset value according to the ARI value.

According to the nineteenth aspect, when the absolute value of an A/N resource offset is small and overlapping with other dynamic A/N regions is more likely to occur, it is possible to increase the dynamic offset value by ARI and thereby reduce the probability of collision of A/N resources. Meanwhile, when the absolute value of an A/N resource offset is large and the dynamic offset by ARI is more likely to reduce PUSCH resources, it is possible to reduce the dynamic offset value by ARI and suppress the amount of reduction in PUSCH resources. Furthermore, this can be implemented without additional signaling.

A twentieth aspect of the present disclosure provides a resource allocation method including: determining an offset value indicated by an ACK/NACK index (ARI: ACK/NACK Resource Indicator) according to whether or not a resource region usable for a dynamic ACK/NACK resource corresponding to an E-PDCCH set via which a control signal has been received overlaps with a resource region usable for a dynamic ACK/NACK resource corresponding to another E-PDCCH set; and giving an offset to the ACK/NACK resource according to the ARI value.

According to the twentieth aspect, although a dynamic A/N region corresponding to an E-PDCCH set via which E-PDCCH control information is transmitted and/or received is set, it is possible to switch the dynamic offset value by ARI depending on whether or not the dynamic A/N regions overlaps with a dynamic A/N region corresponding to another E-PDCCH set. Through this switching, when a plurality of dynamic A/N regions overlap with each other, it is possible to reduce an offset value indicated by ARI and suppress a further increase in PUCCH overhead, and when a plurality of dynamic A/N regions do not overlap with each other, it is possible to increase an offset value indicated by ARI and avoid collision of A/N resources. Therefore, it is possible to contribute to avoidance of collision of A/N resources and suppression of PUCCH overhead according to the operation situation of dynamic A/N regions. Furthermore, these can be implemented without additional signaling.

A twenty-first aspect of the present disclosure provides the resource allocation method according to the twentieth aspect, in which, when the resource region usable for a dynamic ACK/NACK resource corresponding to the E-PDCCH set via which the control signal has been received overlaps with the resource region usable for a dynamic ACK/NACK resource corresponding to the other E-PDCCH set, the offset value indicated by the ARI is determined to be identical to the resource region usable for the dynamic ACK/NACK resource corresponding to the E-PDCCH set via which the control signal has been received or a resource region obtained by adding a constant to the resource region usable for the dynamic ACK/NACK resource corresponding to the E-PDCCH set via which the control signal has been received, and the ACK/NACK resource for transmitting an ACK/NACK signal is thereby determined.

According to the twenty-first aspect, it is possible to determine an appropriate ARI offset value for achieving a reduction in the probability of collision of A/N resources according to the scale of dynamic A/N regions that may differ depending on the number of PRBs included in the E-PDCCH set without excessively increasing overhead of PUCCH resources. Furthermore, this can be implemented without additional signaling.

A twenty-second aspect of the present disclosure provides the resource allocation method according to the twentieth aspect, in which, when the resource region usable for a dynamic ACK/NACK resource corresponding to the E-PDCCH set via which the control signal has been received overlaps with the resource region usable for a dynamic ACK/NACK resource corresponding to the other E-PDCCH set, the offset value indicated by the ARI is determined according to a number of overlapping resources between the dynamic ACK/NACK resource corresponding to the E-PDCCH set via which the control signal has been received and the resource region usable for the dynamic ACK/NACK resource corresponding to the other E-PDCCH set, and the ACK/NACK resource for transmitting an ACK/NACK signal is thereby determined.

According to the twenty-second aspect, when dynamic A/N regions corresponding to E-PDCCH control information partially overlap with each other, it is possible to determine an appropriate ARI offset value for achieving a reduction in the probability of collision of A/N resources without excessively increasing overhead of PUCCH resources. Furthermore, this can be implemented without additional signaling.

A twenty-third aspect of the present disclosure provides the resource allocation method according to the twentieth aspect, in which, when the resource region usable for a dynamic ACK/NACK resource corresponding to the E-PDCCH set via which the control signal has been received overlaps with the resource region usable for a dynamic ACK/NACK resource corresponding to the other E-PDCCH set, the offset value indicated by the ARI is determined based on a difference between an ACK/NACK resource offset value indicated from a higher layer in correspondence to the E-PDCCH set via which the control signal has been received and an ACK/NACK resource offset value indicated from the higher layer in correspondence to the other E-PDCCH set, and the ACK/NACK resource for transmitting an ACK/NACK signal is thereby determined.

According to the twenty-third aspect, it is possible to derive an appropriate dynamic offset value by ARI with fewer calculation processes when dynamic A/N regions corresponding to E-PDCCH control information partially overlap with each other. Furthermore, this can be implemented without additional signaling.

A twenty-fourth aspect of the present disclosure provides the resource allocation method according to the twentieth aspect, in which, when the resource region usable for a dynamic ACK/NACK resource corresponding to the E-PDCCH set via which the control signal has been received overlaps with the resource region usable for a dynamic ACK/NACK resource corresponding to the other E-PDCCH set, and the overlapping resource regions are different in size, the offset value indicated by the ARI is determined according to the size of the overlapping resource regions, and the ACK/NACK resource for transmitting an ACK/NACK signal is thereby determined.

According to the twenty-fourth aspect, even when the dynamic A/N regions corresponding to a plurality of E-PDCCH sets are different in size, it is possible to set an offset capable of reliably avoiding collision. Furthermore, this can be implemented without additional signaling.

A twenty-fifth aspect of the present disclosure provides the resource allocation method according to the twentieth aspect, in which, when the resource region useable for a dynamic ACK/NACK resource corresponding to the E-PDCCH set via which the control signal has been received overlaps with the resource region useable for a dynamic ACK/NACK resource corresponding to PDCCH, the offset value indicated by the ARI is determined according to a size of the region usable for the dynamic ACK/NACK resource corresponding to the PDCCH set, and the ACK/NACK resource for transmitting an ACK/NACK signal is thereby determined.

According to the twenty-fifth aspect, even when a dynamic A/N region corresponding to E-PDCCH and a dynamic A/N region corresponding to PDCCH overlap with each other and are operated, it is possible to give an appropriate offset by ARI and avoid collision. Furthermore, this can be implemented without additional signaling.

A twenty-sixth aspect of the present disclosure provides the resource allocation method according to the twentieth aspect, in which, when the resource region usable for a dynamic ACK/NACK resource corresponding to the E-PDCCH set via which the control signal has been received does not overlap with the resource region usable for a dynamic ACK/NACK resource corresponding to the other E-PDCCH set or PDCCH, whether or not a secondary spreading sequence (block-wise spreading sequence) corresponding to an ACK/NACK resource of a dynamic ACK/NACK determined with no offset by the ARI is replaceable with an orthogonal code orthogonal to the secondary spreading sequence is determined in accordance with the ARI value.

According to the twenty-sixth aspect, when the dynamic A/N region corresponding to the E-PDCCH set via which E-PDCCH control information is transmitted and/or received does not overlap with another dynamic A/N region, it is possible to change an orthogonal code of a secondary spreading sequence by ARI. It is thereby possible to multiplex terminals having a large delay spread difference with the same PRB with different codes, for which it has been conventionally difficult to perform multiplexing by only adding a small dynamic offset by ARI. Therefore, it is possible to realize a combination of terminals 200 in more flexible multiuser MIMO and increase the degree of freedom of scheduling. Furthermore, this can be implemented without additional signaling.

A twenty-seventh aspect of the present disclosure provides the resource allocation method according to the twentieth aspect, in which, the dynamic offset value of the ARI is determined according to an absolute value of an A/N resource offset parameter indicating a start position of the resource region usable for a dynamic ACK/NACK resource corresponding to the E-PDCCH set via which the control signal has been received, and whether or not to add the dynamic offset value is determined according to the ARI value.

According to the twenty-seventh aspect, when the absolute value of an A/N resource offset is small and overlapping with other dynamic A/N regions is more likely to occur, it is possible to increase the dynamic offset value by ARI and thereby reduce the probability of collision of A/N resources. Meanwhile, when the absolute value of an A/N resource offset is large and the dynamic offset by ARI is more likely to reduce PUSCH resources, it is possible to reduce the dynamic offset value by ARI and suppress the amount of reduction in PUSCH resources. Furthermore, this can be implemented without additional signaling.

The disclosure of Japanese Patent Application No. 2012-214981, filed on Sep. 27, 2012, including the specification, drawings and abstract is incorporated herein by reference in its entirety.

INDUSTRIAL APPLICABILITY

The present invention is applicable to a radio communication terminal, a base station apparatus, a resource allocation method, and the like of a mobile communication system.

REFERENCE SIGNS LIST

11 Antenna
12 Control information generation section

13 Control information coding section
14, 17 Modulation section
15 Data coding section
16 Retransmission control section
18 Subframe configuration section
19 IFFT section
20 CP adding section
21 Radio transmitting section
22 Radio receiving section
23 CP removal section
24 Despreading section
25 Correlation processing section
26 Determination section
41 Antenna
42 Radio receiving section
43 CP removal section
44 FFT section
45 Extraction section
46 Data demodulation section
47 Data decoding section
48 Determination section
49 Control information demodulation section
50 Control information decoding section
51 Control information determination section
52 Control processing section
53 A/N signal modulation section
54 Primary spreading section
55, 60 IFFT section
56 CP adding section
57 Secondary spreading section
58 Multiplexing section
59 Radio transmitting section
61 CP adding section
62 Spreading section
100 Base station
110 Control section
120 Transmitting section
200 Terminal
210 Transmitting section
220 Control section
230 Receiving section

The invention claimed is:

1. An integrated circuit to control a process of a radio communication terminal, the integrated circuit comprising circuitry which, in operation, controls the process which includes:
receiving control information including an ACK/NACK Resource Indicator (ARI) via an Enhanced Physical Downlink Control Channel (E-PDCCH) detected in an E-PDCCH set;
determining an ACK/NACK resource offset value based on the ARI;
determining an ACK/NACK resource for transmitting an ACK/NACK signal based on the determined ACK/NACK resource offset value; and
transmitting the ACK/NACK signal using the determined ACK/NACK resource,
wherein the ARI has two bits and the ACK/NACK resource offset value takes one of four values based on the two bits including a first value associated with 0, a second value associated with a fixed offset, and third and fourth values associated with dynamic offsets that depend on a total number of Enhanced Control Channel Elements (ECCEs) included in the E-PDCCH set in which the E-PDCCH including the ARI is detected.

2. The integrated circuit according to claim 1, wherein at least one of the third and fourth values is a negative value.

3. The integrated circuit according to claim 2, wherein the negative ACK/NACK resource offset value facilitates reducing an ACK/NACK resource overhead in resources of a Physical Uplink Shared Channel (PUSCH).

4. The integrated circuit according to claim 1, wherein the ARI has more than two bits.

5. The integrated circuit according to claim 1, wherein the process comprises:
determining the ACK/NACK resource offset value according to whether or not there is an overlap between a first resource region of a dynamic ACK/NACK resource for the E-PDCCH set in which the E-PDCCH is detected and a second resource region of a dynamic ACK/NACK resource for another E-PDCCH set.

6. The integrated circuit according to claim 5, wherein the process comprises:
when there is the overlap, determining the ACK/NACK resource offset value to correspond to the first resource region or to a resource region obtained by adding a constant to the first resource region.

7. The integrated circuit according to claim 5, wherein the process comprises:
when there is the overlap, determining the ACK/NACK resource offset value according to a number of overlapping resources between the first and second resource regions.

8. The integrated circuit according to claim 5, wherein the process comprises:
when there is the overlap, determining the ACK/NACK resource offset value according to an overlapping size of the first and second resource regions.

9. The integrated circuit according to claim 1, comprising:
at least one input coupled to the circuitry, wherein the at least one input, in operation, inputs data; and
at least one output coupled to the circuitry, wherein the at least one output, in operation, outputs data.

10. An integrated circuit comprising:
reception circuitry which, in operation, controls reception of control information including an ACK/NACK Resource Indicator (ARI) via an Enhanced Physical Downlink Control Channel (E-PDCCH) detected in an E-PDCCH set;
control circuitry which, in operation, determines an ACK/NACK resource offset value based on the ARI and determines an ACK/NACK resource for transmitting an ACK/NACK signal based on the determined ACK/NACK resource offset value; and
transmission circuitry which, in operation, controls transmission of the ACK/NACK signal using the determined ACK/NACK resource,
wherein the ARI has two bits and the ACK/NACK resource offset value takes one of four values based on the two bits including a first value associated with 0, a second value associated with a fixed offset, and third and fourth values associated with dynamic offsets that depend on a total number of Enhanced Control Channel Elements (ECCEs) included in the E-PDCCH set in which the E-PDCCH including the ARI is detected.

11. The integrated circuit according to claim 10, wherein at least one of the third and fourth values is a negative value.

12. The integrated circuit according to claim 11, wherein the negative ACK/NACK resource offset value facilitates reducing an ACK/NACK resource overhead in resources of a Physical Uplink Shared Channel (PUSCH).

13. The integrated circuit according to claim 10, wherein the ARI has more than two bits.

14. The integrated circuit according to claim 10, wherein the control circuitry, in operation, determines the ACK/NACK resource offset value depending on whether or not there is an overlap between a first resource region of a dynamic ACK/NACK resource for the E-PDCCH set in which the E-PDCCH is detected and a second resource region of a dynamic ACK/NACK resource for another E-PDCCH set.

15. The integrated circuit according to claim 14, wherein, when there is the overlap, the control circuitry determines the ACK/NACK resource offset value to correspond to the first resource region or to a resource region obtained by adding a constant to the first resource region.

16. The integrated circuit according to claim 14, wherein, when there is the overlap, the control circuitry determines the ACK/NACK resource offset value according to a number of overlapping resources between the first and second resource regions.

17. The integrated circuit according to claim 14, wherein, when there is the overlap, the control circuitry determines the ACK/NACK resource offset value based on a difference between a first ACK/NACK resource offset value indicated by a higher layer for the E-PDCCH set in which the E-PDCCH is detected and a second ACK/NACK resource offset value indicated by the higher layer for the other E-PDCCH set.

18. The integrated circuit according to claim 14, wherein, when there is the overlap, the control circuitry determines the ACK/NACK resource offset value according to an overlapping size of the first and second resource regions.

19. The integrated circuit according to claim 14, wherein, when there is an overlap between the first resource region and a third resource region of a dynamic ACK/NACK resource for a Physical Downlink Control Channel (PDCCH), the control circuitry determines the ACK/NACK resource offset value according to a size of the third resource region.

* * * * *